(12) United States Patent
Gross

(10) Patent No.: US 7,452,067 B2
(45) Date of Patent: Nov. 18, 2008

(54) ELECTRONIC TRANSPARENCY REGULATION ELEMENT TO ENHANCE VIEWING THROUGH LENS SYSTEM

(76) Inventor: Yossi Gross, 10 HaNotea Street, 73160 Moshav Mazor (IL)

(*) Notice: Subject to any disclaimer, the term of this patent is extended or adjusted under 35 U.S.C. 154(b) by 0 days.

(21) Appl. No.: 11/740,582

(22) Filed: Apr. 26, 2007

(65) Prior Publication Data
US 2008/0151175 A1 Jun. 26, 2008

Related U.S. Application Data

(60) Provisional application No. 60/877,062, filed on Dec. 22, 2006.

(51) Int. Cl.
G02C 7/16 (2006.01)
A61B 3/00 (2006.01)
(52) U.S. Cl. .................. 351/45; 351/200; 351/246
(58) Field of Classification Search .......... 351/41, 351/44, 45, 200, 203, 222, 246; 349/13
See application file for complete search history.

(56) References Cited

U.S. PATENT DOCUMENTS

| | | | |
|---|---|---|---|
| 4,106,217 A * | 8/1978 | Witt ........................ 434/36 |
| 4,190,330 A | 2/1980 | Berreman | |
| 4,279,474 A | 7/1981 | Belgorod | |
| 4,601,545 A | 7/1986 | Kern | |
| 4,756,605 A | 7/1988 | Okada et al. | |
| 5,452,026 A | 9/1995 | Marcy, III | |
| 5,552,841 A | 9/1996 | Gallorini et al. | |
| 5,680,195 A | 10/1997 | Pekar et al. | |
| 6,437,927 B1 | 8/2002 | Shafer | |
| 6,491,391 B1 * | 12/2002 | Blum et al. ................ 351/159 |
| 6,775,060 B2 | 8/2004 | Peli et al. | |

(Continued)

FOREIGN PATENT DOCUMENTS

WO 9812591 3/1998

(Continued)

OTHER PUBLICATIONS

Bowers A. R. et al., "Bioptic telescopes meet needs of drivers with moderate visual acuity loss," Invest Ophthamol Vis Sci 46(1): 66-74 (2005).

(Continued)

Primary Examiner—Huy K Mai
(74) Attorney, Agent, or Firm—Darby & Darby PC

(57) ABSTRACT

Apparatus is provided including a frame configured to be worn on a face, such that a portion of the frame is located in front of a first eye and not in front of a second eye. The apparatus also includes a first lens, including one or more first lenses, coupled to the portion of the frame, and a second lens system, including one or more second lenses, coupled to the portion. A transparency regulation element coupled to the first lens system has variable transparency, and is configured to enhance viewing through the second lens system. A power unit is configured to drive the transparency regulation element to darken the first lens system without substantially darkening at least a portion of the second lens system during a first period, and, during a second period after the first period, to not drive the transparency regulation element to darken the first lens system.

22 Claims, 10 Drawing Sheets

U.S. PATENT DOCUMENTS

| | | |
|---|---|---|
| 2002/0140899 A1 | 10/2002 | Blum et al. |
| 2006/0139570 A1 | 6/2006 | Blum et al. |
| 2006/0146275 A1 | 7/2006 | Mertz |
| 2007/0091258 A1 | 4/2007 | Blum et al. |

FOREIGN PATENT DOCUMENTS

| | | |
|---|---|---|
| WO | 03032066 | 4/2003 |
| WO | 2004072687 | 8/2004 |
| WO | 2005043224 | 5/2005 |
| WO | 2005051254 | 6/2005 |
| WO | 2005103797 | 11/2005 |
| WO | 2006036762 | 4/2006 |
| WO | 2006050171 | 5/2006 |
| WO | 2006050366 | 5/2006 |

OTHER PUBLICATIONS

Peli E et al., "In-the-spectacle-lens telescopic device for low vision," Schepens Eye Research Institute, Harvard Medical School, Proceedings of SPIE vol. 4611, Opthalmic Technologies XII pp. 129-135 (2002).

The National Institute for Rehabilitation Engineering (NIRE), "Eyeglasses for people with vertical eye movement disorders and/or ambulation disorders—from PSP or parkinsonism (PSP=progressive supranuclear palsy). Eyeglasses for people missing lower halves of visual fields," (2003).

Hoeft W. W. et. al., "Amorphic lenses: a mobility aid for patients with retinitis pigmentosa," American Journal of Optometry & Physiological Optics 62(2): 142-8 (1985).

* cited by examiner

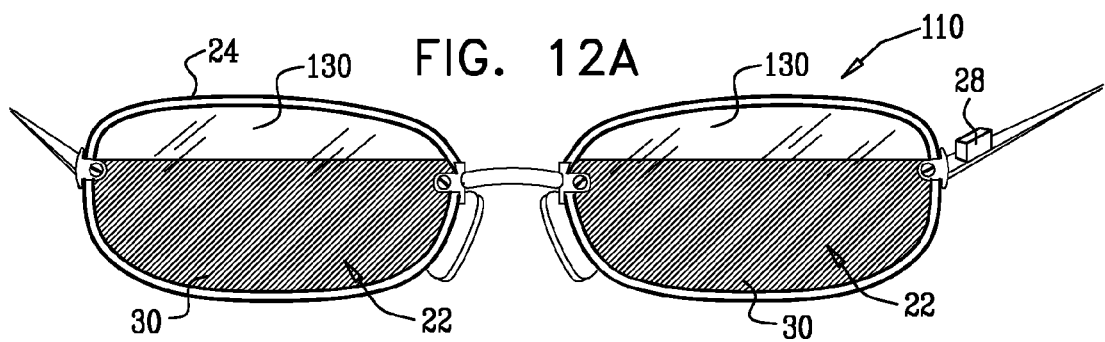
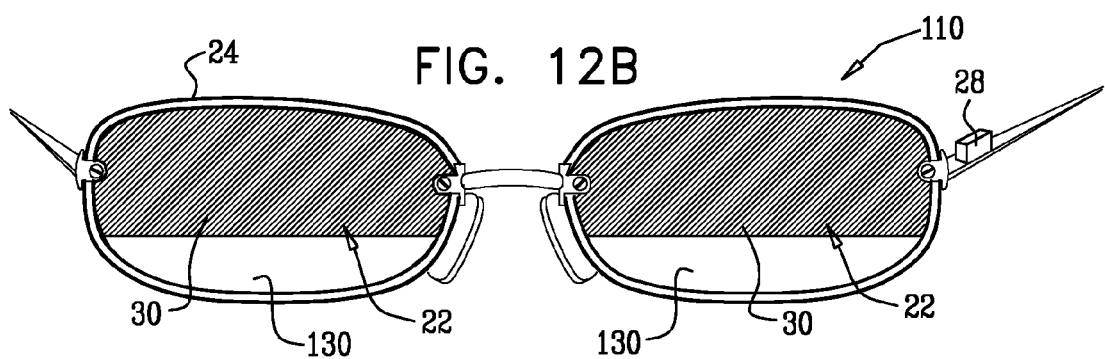
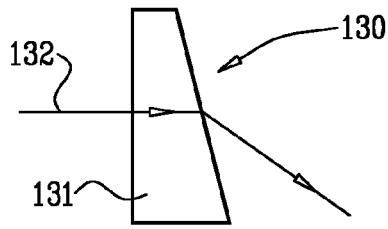
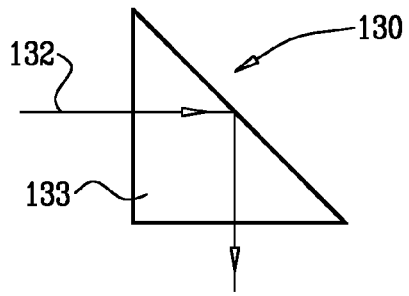
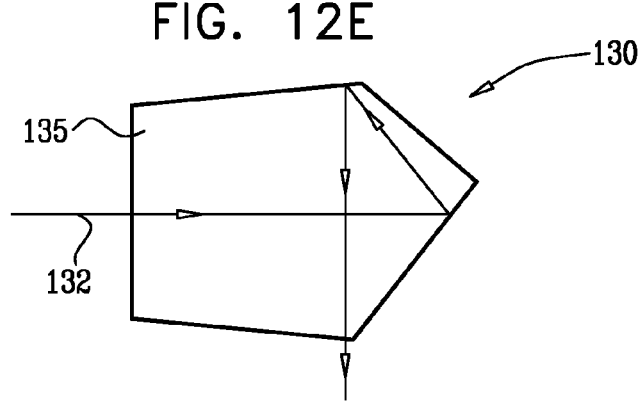

ELECTRONIC TRANSPARENCY REGULATION ELEMENT TO ENHANCE VIEWING THROUGH LENS SYSTEM

CROSS-REFERENCES TO RELATED APPLICATIONS

The present patent application claims priority from U.S. Provisional Patent Application 60/877,062 to Gross, entitled, "Electronic transparency regulation unit to enhance viewing through magnification lens system," filed on Dec. 22, 2006, which is assigned to the assignee of the present application and is incorporated herein by reference.

FIELD OF THE INVENTION

The present invention generally relates to external vision apparatus. Specifically, the present invention relates to enhancing viewing through a lens system.

BACKGROUND OF THE INVENTION

Conservative estimates suggest that there are at least 3.5 to 5 million Americans who are visually impaired. Bioptic systems are frequently prescribed for patients desiring increased visual acuity for reading or close work.

Eye movement disorders are experienced by many patients suffering from progressive supranuclear palsy (PSP). Some patients with other neurological diseases and/or Parkinsonism also experience vertical eye movement difficulties which make desktop functions such as reading, writing, and typing difficult or impossible. These patients are unable to turn their eyes downward due to the effects of the neurological disease. Visual field disorders such as altitudinal hemianopia are experienced by patients who are capable of vertical eye movement, but express a decrease or lack of vision in the lower half of the visual field. Both eye movement disorders and visual field disorders affect the gait and balance of the subject experiencing the visual disorder.

U.S. Pat. No. 5,452,026 to Marcy III et al., which is incorporated herein by reference, describes a vision improvement device using glasses in which one or more lenses is a rapid shutter, such as a liquid crystal shutter. The subject wears the glasses and the shutter is rapidly operated such that vision from the strong eye is subdued or blocked off long enough to allow the weak eye information to be processed by the brain to promote improved depth perception. One eye is permitted to see while the other eye is occluded. By control of the shutter, the weaker eye can be exposed for longer than the stronger eye to compensate for the brain's ability to ignore the weak eye information. As such, control over vision is described as resulting in an improved balance of per-eye information, increasing stereoscopic vision.

U.S. Pat. No. 4,279,474 to Belgorod et al., which is incorporated herein by reference, describes a spectacle lens comprising a liquid crystal layer and electrode assembly sandwiched between a pair of identically curved glass plates and layers of polarization material on the outer surfaces of the plates. The optical density of the lens is controlled by applying across the electrodes variable duty cycle voltage pulses. The duty cycle of the pulses is controlled in response to ambient light intensity measured by a photocell.

PCT Publication WO 05/043224 to Herzog et al., which is incorporated herein by reference, describes an electronically controlled, liquid-crystal eyeglass system designed for intermittent occlusion, while exercising the eyes of a user, through combined occlusion-and-exercising sessions, wherein the eyeglass system includes features to improve and monitor compliance. The system is described as having an ordinary eyeglass design, wherein the electronic components are miniaturized and hidden, having a reflective coating on the exterior surfaces of the lenses, for identical exterior appearance, even when the two lenses operate at different opacity levels. In this manner, the liquid-crystal eyeglass system does not attract attention. The liquid-crystal eyeglass system is described as being used in the treatment of amblyopia, strabismus, and a weak eye, and may be integrated with sunglasses and/or with glasses for corrective vision.

PCT Publication WO 05/051254 to Yang et al., which is incorporated herein by reference, describes a portable liquid crystal eye shield powered by a solar battery, which can adjust transmission index of light in response to the intensity of surroundings. A solar cell is mounted on a mask. The liquid crystal panel is mounted on the inner surface of a glass shield.

U.S. Pat. No. 4,601,545 to Kern et al., which is incorporated herein by reference, describes a variable lens. In one form the lens power is described as being varied and in another the power may be selectively fixed in a carrier material. There are no moving mechanical parts but instead an optically active molecular material such as liquid crystals. In one embodiment, the lens and control means for varying the power of the lens are mounted on a common substrate. A variable gradient index of refraction is achievable by applying a controlled stimulus field to the lens. For example, a geometrically configured matrix of electrical voltages, each at a selected addressable location relative to the optically active material, provides the gradient in one embodiment. A thin film embodiment finds applications in magnifying glasses, cameras, telescopes, microscopes, as well as for intraocular and contact lenses for the human eye.

U.S. Pat. No. 6,775,060 to Peli et al., which is incorporated herein by reference, describes apparatus and methods for increasing visual acuity through the use of a bioptic telescope which is at least partially embedded in a spectacle lens. In one embodiment, the telescope includes a vision lens having a vision axis and a first surface for placement substantially in front of an eye of a user. The telescope further includes a plurality of optical elements defining an optical path for viewing an object in front of the first surface. At least one of the plurality of optical elements is positioned such that at least a portion of the optical path is located within the vision lens in a plane substantially orthogonal to the vision axis.

The following patents and patent applications, which are incorporated herein by reference, may be of interest:

U.S. Pat. No. 4,756,605 to Okada et al.

U.S. Pat. No. 4,190,330 to Berreman et al.

U.S. Patent Application Publication 2006/0146275 to Metrz et al.

U.S. Pat. No. 5,552,841 to Gallorini et al.

U.S. Pat. No. 5,680,195 to Pekar et al.

U.S. Pat. No. 6,437,927 to Shafer et al.

The following articles, which are incorporated herein by reference, may be of interest:

Bowers A R et al., "Bioptic telescopes meet needs of drivers with moderate visual acuity loss," Invest Ophthamol Vis Sci 46(1):66-74 (2005)

Peli E et al., "In-the-spectacle-lens telescopic device for low vision" Schepens Eye Research Institute, Harvard Medical School, Proceedings of SPIE Vol. 4611, Ophthalmic Technologies XII pp. 129-135 (2002)

The National Institute for Rehabilitation Engineering (NIRE), "Eyeglasses for People With Vertical Eye Movement Disorders and/or Ambulation Disorders—from PSP* or Parkinsonism (*PSP=Progressive Supranuclear Palsy). Eyeglasses for People Missing Lower Halves of Visual Fields" (2003)

Hoeft W W et al., "Amorphic lenses: a mobility aid for patients with retinitis pigmentosa," Am J Optom Physiol Opt 62(2):142-8 (1985)

SUMMARY OF THE INVENTION

In some embodiments of the present invention, an electronic transparency regulation element having variable transparency is configured to enhance viewing through a magnification lens system coupled to a vision-enhancing instrument comprising one or more spectacle lenses. Typically, the transparency regulation element is configured to enhance the viewing by enhancing visual acuity through the magnification lens system. Alternatively or additionally, the transparency regulation element is configured to restrict or minimize simultaneous viewing of peripheral objects, e.g., objects not directly viewed through the magnification lens system.

Typically, the one or more spectacle lenses are held together by a frame comprising a power unit, which supplies voltage to the transparency regulation element. Upon activation by a subject desiring to look through the magnification lens system, the transparency regulation element is configured to substantially darken and diminish light passage through portions of the one or more spectacle lenses not containing the magnification lens system.

For some applications, the one or more spectacle lenses comprise exactly two lenses. Each of the two lenses is coupled to a magnification lens system configured for viewing objects at a distance. Alternatively, each of the two lenses is coupled to a magnification lens system configured for viewing near objects. Further alternatively, a first of the two lenses is coupled to the magnification lens system configured for viewing objects at a distance, and a second of the two lenses is coupled to the magnification lens system configured for viewing near objects. Yet further alternatively, only one magnification lens system is coupled to only one lens of the exactly two lenses.

In some embodiments of the present invention, the magnification lens system is coupled directly to the frame, and is typically pivoted towards the one or more spectacle lenses in order for the subject to view through the magnification lens system.

Typically, the transparency regulation element comprises a tinting device, e.g., a liquid crystal device.

In an embodiment, the transparency regulation element is configured to be coupled to an additional spectacle lens of the vision-enhancing instrument and is configured to substantially darken the additional spectacle lens when the subject desires to look through the magnification lens system. Consequently, viewing through the magnification lens system is enhanced.

For some applications, once viewing through the magnification lens system is no longer desired, the transparency regulation element is configured to substantially darken the portion of the one or more spectacle lenses containing the magnification lens system (e.g., upon activation by the subject). In this manner, light passage through the magnification lens system is diminished or substantially eliminated, while light passage through the remaining portions of the one or more spectacle lenses is generally not inhibited.

Typically, the transparency regulation element is configured to be coupled to an outer surface of at least one of the one or more lenses of the vision-enhancing instrument, and to protrude slightly therefrom. Alternatively, the transparency regulation element is configured to be embedded within at least one of the one or more spectacle lenses. In an embodiment, the frames comprise side-blinders which reduce glare affecting viewing through the magnification lens system.

The magnification lens system is typically used to view objects at a far distance from an individual wearing the instrument. Alternatively, the magnification lens system is used to view near objects. In an embodiment, a magnification lens system for viewing far objects is disposed upon a first lens of the one or more spectacle lenses, and a magnification lens system for viewing near objects is disposed upon a second lens of the one or more spectacle lenses, such that the transparency regulation element is configured to substantially darken portions of the first spectacle lens and the second spectacle lens that do not contain the magnification lens system currently being used, to allow for enhanced viewing through the magnification lens system currently being used. In an embodiment, the transparency regulation element is configured to substantially darken the entire spectacle lens not containing the magnification lens system currently being used. Additionally or alternatively, the two magnification lens systems are configured to be disposed upon the same lens of the one or more spectacle lenses, while viewing through one magnification lens system is achieved by substantially darkening portions of the one or more spectacle lenses not containing that magnification lens system.

The magnification lens system comprises one or more lenses configured to enhance vision, such as a bioptic telescope for viewing objects at a far distance (e.g., a Keplerian, Galilean, catadioptric, or other telescope known in the art), a magnifying glass for viewing near objects, or other lens system known in the art.

In some embodiments of the present invention, at least one of the one or more spectacle lenses of the vision-enhancing instrument comprises one or more lens elements. Typically, the one or more lens elements comprises exactly two lens elements and the transparency regulation element is configured to be disposed therebetween. Alternatively, the transparency regulation element is configured to be disposed upon an outer or an inner surface of at least one of the one or more lens elements.

In an embodiment, at least one of the one or more lens elements is configured to function as at least a portion of the magnification lens system, by shaping the at least one lens element so as to provide a portion of the magnification of the magnification lens system. In some embodiments, the at least one lens element comprises a reflective surface in addition to one or more refractive surfaces of the at least one lens element, configured to create a catadioptric telescope. For some applications, two lens elements each comprising both a reflective and refractive surface are used to create the catadioptric telescope.

In some embodiments of the present invention, the vision-enhancing instrument comprises exactly two spectacle lenses, wherein at least one spectacle lens contains first and second regions. The first lens region is configured for viewing near objects when the second lens region is substantially darkened by the transparency regulation element in response to activation by the subject wearing the glasses. Conversely, the second lens region is configured for viewing far objects when the first lens region is substantially darkened by the transparency regulation element.

In some embodiments of the present invention, a transparency regulation element, configured to be coupled to at least one lens of the one or more spectacle lenses of the vision enhancing instrument, is configured to provide a pinhole opening. Visual acuity through the pinhole is enhanced when, upon activation, the transparency regulation element substantially darkens portions of the lens surrounding the pinhole. For some applications, the transparency regulation element is configured to darken a second lens of the one or more spectacle lenses of the vision-enhancing instrument not comprising a pinhole opening.

In some embodiments of the present invention, a prism-compensating apparatus comprises at least one spectacle lens and a prism. Typically, the prism is configured to provide a wider scope of vision, e.g., upwards, downwards and/or laterally, such as for subjects limited in their visual range or eye movement. During viewing through the prism, the portions of the at least one lens not containing the prism are substantially darkened by the transparency regulation element, enabling enhanced visual acuity through the prism. Optionally, when the subject is using the portions of the lens not containing the prism, the prism is substantially darkened by the transparency regulation element.

There is therefore provided, in accordance with an embodiment of the present invention, apparatus including:

a frame configured to be worn on a face of a subject, such that a portion of the frame is located in front of a first eye of the subject and not in front of a second eye of the subject;

a first lens system coupled to the portion of the frame, the first lens system including one or more first lenses;

a second lens system coupled to the portion of the frame, the second lens system including one or more second lenses;

a transparency regulation element coupled to the first lens system, the transparency regulation element having variable transparency, and configured to enhance viewing through the second lens system; and a power unit coupled to the frame, configured to:

during a first period, drive the transparency regulation element to darken the first lens system without substantially darkening at least a portion of the second lens system, and during a second period after the first period, not drive the transparency regulation element to darken the first lens system.

In an embodiment, the transparency regulation element includes a liquid crystal device.

In an embodiment, the transparency regulation element is configured to enhance visual acuity through the second lens system.

In an embodiment, the transparency regulation element is configured to minimize viewing of peripheral objects that are not directly viewed through the second lens system.

In an embodiment, the transparency regulation element is disposed with respect to the first lens system so as to:

darken a first portion of at least one of the first lenses, through which first portion light passing through the second lens system does not pass, and substantially not darken a second portion of the first lenses, through which second portion light passing through the second lens system does pass.

In an embodiment, the frame includes a light source coupled thereto.

In an embodiment, the frame includes side-blinders.

In an embodiment, at least one of the second lenses is embedded within at least one of the first lenses.

In an embodiment, the transparency regulation element includes a polymer, and the power unit modulates a level of transparency of the polymer by driving the polymer to change a state thereof.

In an embodiment, the transparency regulation element is embedded within at least one of the first lenses.

In an embodiment, the transparency regulation element is disposed on an outer surface of at least one of the first lenses.

In an embodiment, the transparency regulation element is disposed on an inner surface of at least one of the first lenses.

In an embodiment, the transparency regulation element is configured to reduce background light by darkening at least a portion of at least one of the first lenses.

In an embodiment, the power unit includes a rechargeable battery.

In an embodiment, the power unit includes a photovoltaic charger.

In an embodiment, the power unit includes circuitry, such as a microcontroller.

In an embodiment, the power unit includes:

an input device including at least one element selected from the group consisting of: a switch, a button, a touch-sensitive panel, and a voice activation unit;

a power supply configured to drive current through the transparency regulation element; and circuitry, such as a microcontroller, configured to process input from the selected element and actuate the power supply in response thereto.

In an embodiment, the power unit is configured to detect a distance between the frame and a remote object, and to drive the transparency regulation element to darken the first lens system in response to the distance.

In an embodiment, the transparency regulation element includes a first transparency regulation element, and including a second transparency regulation element coupled to the second lens system, and the power unit is configured to drive the second transparency regulation element to darken the second lens system during at least a portion of the second period.

In an embodiment, the second lens system includes a magnification lens system.

In an embodiment, the magnification lens system includes at least one element selected from the group consisting of: a Keplerian telescope, a Galilean telescope, a catadioptric telescope, and a magnifying glass.

In an embodiment, the one or more first lenses include one or more spectacle lens elements, and at least a portion of at least one of the one or more spectacle lens elements is configured to function as at least a portion of the magnification lens system.

In an embodiment, the one or more spectacle lens elements are shaped so as to define the magnification lens system.

In an embodiment, the one or more spectacle lens elements include at least one reflective surface.

In an embodiment, the magnification lens system includes at least one element selected from the group consisting of: a Keplerian telescope, a Galilean telescope, a catadioptric telescope, and a magnifying glass.

In an embodiment, at least one of the one or more second lenses is coupled to at least one of the one or more first lenses, such that the second lens system is coupled to the portion of the frame via the first lens system.

In an embodiment, the second lens system protrudes from the first lenses towards the face of the subject.

In an embodiment, the second lens system protrudes from the first lenses away from the face of the subject.

In an embodiment, the second lens system is coupled to the portion of the frame not via the first lens system.

In an embodiment, the magnification lens system is configured to pivot and align with the first eye of the subject, and the power unit is configured to drive the transparency regulation element in response to the pivoting.

In an embodiment, the first lens system is configured for viewing near objects, and the second lens system is configured for viewing far objects.

In an embodiment, the transparency regulation element includes a first transparency regulation element, and including a second transparency regulation element coupled to the second lens system, and the power unit is configured to drive the second transparency regulation element to darken the second lens system during at least a portion of the second period.

In an embodiment, the apparatus includes an angle detection device, coupled to the frame, the power unit includes circuitry, such as a microcontroller, configured to process a detection by the angle detection device and drive the transparency regulation element to darken the first lens system in response to the detection.

In an embodiment, the angle detection device is configured to detect an angle of the frame, and the circuitry, such as a microcontroller, is configured to drive the transparency regulation element to darken the first lens system in response to the angle.

In an embodiment, the apparatus includes a sensor coupled to the frame, which sensor is configured to generate a sensing signal, and the power unit includes, such as a microcontroller, configured to drive the transparency regulation element to darken the first lens system in response to the signal.

In an embodiment, the sensor is configured to detect eye movement of the subject.

In an embodiment, the sensor is configured to detect at least one type of energy selected from the group consisting of: visible radiation, infrared radiation, ultrasound energy, and radiofrequency energy.

In an embodiment, the power unit is configured to determine an orientation of a remote object with respect to the frame, and to drive the drive the transparency regulation element to darken the first lens system in response to the orientation.

In an embodiment, the apparatus includes a transmitter, which is configured to be placed in a vicinity of the remote object, and to transmit a signal, and the power unit includes a receiver, which is configured to receive the signal, and the power unit is configured to determine the orientation responsively to the signal.

In an embodiment, the apparatus includes a reflective element, which is configured to be placed in a vicinity of the remote object, the power unit includes a transmitter, which is configured to transmit a signal, and a receiver, which is configured to receive a reflection of the signal off of the reflective element, and the power unit is configured to determine the orientation responsively to the received reflection.

In an embodiment, the transmitter is configured to transmit at least one type of energy selected from the group consisting of: visible radiation, infrared radiation, ultrasound energy, and radiofrequency energy.

In an embodiment, the second lens system includes a prism.

In an embodiment, the transparency regulation element is configured to enhance visual acuity through the prism.

In an embodiment, the prism is configured for viewing in a generally downward direction.

In an embodiment, the prism is configured for viewing in a generally upward direction.

In an embodiment, the apparatus includes a motion sensor, which is configured to detect motion of the subject, and the power unit is configured to drive the transparency regulation element to darken the first lens system when less than a threshold amount of motion is sensed.

In an embodiment, the one or more first lenses include one or more first spectacle lenses.

In an embodiment, the one or more second lenses include one or more second spectacle lenses.

There is further provided, in accordance with an embodiment of the present invention, apparatus, including:
a frame;
a vision-enhancing instrument including one or more spectacle lenses coupled to the frame;
a magnification lens system coupled to at least one of the lenses; and
a transparency regulation element coupled to the at least one of the lenses, and configured to darken at least a portion of the at least one of the lenses while substantially not reducing passage of light through the magnification lens system.

There is still further provided, in accordance with an embodiment of the present invention, apparatus, including:
a frame;
a vision-enhancing instrument including first and second spectacle lenses coupled to the frame;
a magnification lens system coupled to the first lens; and
a transparency regulation element configured to diminish light passage through the magnification lens system, and at the same time substantially not to diminish light passage through the second lens.

There is yet further provided, in accordance with an embodiment of the present invention, apparatus, including:
a frame;
a vision-enhancing instrument including one or more spectacle lenses coupled to the frame; and
a transparency regulation element configured to provide a pinhole opening for light passage through at least one of the two lenses.

In an embodiment, the apparatus includes an input device coupled to the frame.

In an embodiment, the input device is configured to modulate a level of transparency of the transparency regulation element surrounding the pinhole.

In an embodiment, the input device is configured to modulate a size of the pinhole opening in response to an input.

There is additionally provided, in accordance with an embodiment of the present invention, apparatus for use with a vision-enhancing instrument including one or more spectacle lenses and a frame, the apparatus including:
a magnification lens system coupled to at least one of the lenses;
a transparency regulation element having variable transparency, configured to enhance viewing through the magnification lens system; and
a power unit, configured to supply voltage to the transparency regulation element.

There is still additionally provided, in accordance with an embodiment of the present invention, apparatus including:
a frame;
at least one spectacle lens coupled to the frame;
a prism coupled to the frame;
a transparency regulation element coupled to the lens, the transparency regulation element having variable transparency, and configured to enhance viewing through the prism; and
a power unit, configured to:
during a first period, drive the transparency regulation element to darken the lens without darkening at least a portion of the prism, and
during a second period after the first period, not drive the transparency regulation element to darken the lens.

In an embodiment, the transparency regulation element includes a first transparency regulation element, and including a second transparency regulation element coupled to the prism, the power unit is configured to drive the second transparency regulation element to darken the prism during at least a portion of the second period.

In an embodiment, the transparency regulation element is configured to enhance visual acuity through the prism.

In an embodiment, the prism is configured for viewing in a generally downward direction.

In an embodiment, the prism is configured for viewing in a generally upward direction.

In an embodiment, the apparatus includes a motion sensor, which is configured to detect motion of a subject wearing the frame, and the power unit is configured to drive the transparency regulation element to darken the lens when less than a threshold amount of motion is sensed.

There is also provided, in accordance with an embodiment of the present invention, a method including:

placing a vision-enhancing instrument on a face of a subject such that at least a first portion and at least a second portion of the instrument are located in front of a first eye of the subject and not in front of a second eye of the subject;

during a first period while the instrument is placed on the face, electrically darkening the first portion, without substantially darkening the second portion; and during a second period after the first period, not darkening the first portion.

In an embodiment, the method includes darkening the second portion during at least a portion of the second period.

In an embodiment, darkening the first portion includes minimizing viewing of peripheral objects that are not directly viewed through the second portion.

In an embodiment, darkening the first portion includes regulating a level of light passing through the first portion.

There is further provided, in accordance with an embodiment of the invention, apparatus, including:

a frame;

a vision-enhancing instrument including one or more spectacle lenses coupled to the frame;

a magnification lens system coupled to at least one of the lenses;

a transparency regulation element having variable transparency, configured to enhance viewing through the magnification lens system; and a power unit, configured to supply voltage to the transparency regulation element.

In an embodiment, the magnification lens system includes at least one element selected from the group consisting of: a Keplerian telescope, a Galilean telescope, a catadioptric telescope, and a magnifying glass.

In an embodiment, the transparency regulation element includes a liquid crystal device.

In an embodiment, the transparency regulation element is configured to enhance visual acuity through the magnification lens system.

In an embodiment, the transparency regulation element is configured to minimize viewing of peripheral objects that are not directly viewed through the magnification lens system.

In an embodiment, the transparency regulation element is disposed with respect to the at least one of the lenses so as to:

permit darkening of a first portion of the at least one of the lenses through which light passing through the magnification lens system does not pass, while substantially not darkening a second portion of the at least one of the lenses through which light passing through the magnification lens system does pass.

In an embodiment, the apparatus includes a light source coupled to the frame.

In an embodiment, the frame includes side-blinders.

In an embodiment, the magnification lens system protrudes from the at least one of the lenses towards a subject wearing the apparatus.

In an embodiment, the magnification lens system protrudes from the at least one of the lenses away from a subject wearing the apparatus.

In an embodiment, the magnification lens system is embedded within the at least one of the lenses.

In an embodiment, the transparency regulation element includes a polymer and the power unit modulates a level of transparency of the polymer by driving the polymer to change a state thereof.

In an embodiment, the transparency regulation element is embedded within the at least one of the lenses.

In an embodiment, the transparency regulation element is disposed on an outer surface of the at least one of the lenses.

In an embodiment, the transparency regulation element is disposed on an inner surface of the at least one of the lenses.

In an embodiment, the transparency regulation element is configured to reduce background light by darkening at least a portion of the at least one of the lenses.

In an embodiment, the power unit includes a rechargeable battery.

In an embodiment, the power unit includes a photovoltaic charger.

In an embodiment, the power unit includes circuitry, such as a microcontroller.

In an embodiment, the power unit includes:

an input device including at least one element selected from the group consisting of: a switch, a button, a touch sensitive panel, and a voice activation unit;

a power supply configured to drive current through the transparency regulation element; and circuitry, such as a microcontroller, configured to process input from the selected element and actuate the power supply in response thereto.

In an embodiment, the magnification lens system is disposed directly upon the frame.

In an embodiment, the magnification lens system is configured to pivot and align with an eye of the subject, and the transparency regulation element is actuated in response to the pivoting.

In an embodiment, the at least one of the lenses includes one or more spectacle lens elements, and a portion of at least one of the one or more spectacle lens elements is configured to function as at least a portion of the magnification lens system.

In an embodiment, the one or more lens elements are shaped so as to define the magnification lens system.

In an embodiment, the one or more lens elements include at least one reflective surface.

In an embodiment, the magnification lens system includes at least one element selected from the group consisting of: a Keplerian telescope, a Galilean telescope, a catadioptric telescope, and a magnifying glass.

In an embodiment, the one or more lenses include a first magnification lens system and a second magnification lens system, and:

the first magnification lens system is configured for viewing near objects when the second magnification lens system is darkened by the transparency regulation element, and the second magnification lens system is configured for viewing far objects when the first magnification lens system is darkened by the transparency regulation element.

In an embodiment, the first magnification lens system and the second magnification lens system are disposed upon one of the one or more lenses.

In an embodiment, the apparatus includes an angle detection device, coupled to the frame, and the power unit includes circuitry, such as a microcontroller, configured to process a detection by the angle detection device and actuate the power unit in response to the detection.

In an embodiment, the angle detection device is configured to detect an angle of the frame, and actuate the power unit in response thereto.

In an embodiment, the apparatus includes a sensor coupled to the frame, and the power unit includes circuitry, such as a microcontroller, configured to process a sensing by the sensor and actuate the power unit in response to the detection.

In an embodiment, the sensor is configured to detect eye movement of a subject.

In an embodiment, the transparency regulation element is configured to regulate a level of light passing through the magnification lens system.

In an embodiment, the transparency regulation element is configured to reduce light passing through the magnification lens system while permitting light to pass through the at least one of the lenses.

There is also provided, in accordance with an embodiment of the invention, apparatus, including:

one or more spectacle lenses including a first lens region and a second lens region; and a transparency regulation element configured to:

at a first time, darken the first lens region and substantially not darken at least a portion of the second lens region, and at a second time, darken the second lens region and substantially not darken at least a portion of the first lens region.

In an embodiment, the one or more spectacle lenses include two spectacle lenses, each including a respective first lens region and a respective second lens region.

In an embodiment, the one or more spectacle lenses include two spectacle lenses, and the first lens region and the second lens region are each disposed on both of the two spectacle lenses.

In an embodiment:

the first lens region is configured for viewing near objects when the second lens region is darkened by the transparency regulation element; and the second lens region is configured for viewing far objects when the first lens region is darkened by the transparency regulation element.

There is additionally provided, in accordance with an embodiment of the invention, apparatus, including:

a frame;

a vision-enhancing instrument including one or more spectacle lenses coupled to the frame;

a magnification lens system coupled to at least one of the lenses; and a transparency regulation element coupled to the at least one of the lenses, and configured to darken at least a portion of the at least one of the lenses while substantially not reducing passage of light through the magnification lens system.

There is yet additionally provided, in accordance with an embodiment of the invention, apparatus, including:

a frame;

a vision-enhancing instrument including first and second spectacle lenses coupled to the frame;

a magnification lens system coupled to the first lens; and a transparency regulation element configured to diminish light passage through the magnification lens system, and at the same time substantially not to diminish light passage through the second lens.

There is still additionally provided, in accordance with an embodiment of the invention, apparatus, including:

a frame;

a vision-enhancing instrument including one or more spectacle lenses coupled to the frame; and a transparency regulation element configured to provide a pinhole opening for light passage through at least one of the two lenses.

In an embodiment, the apparatus includes an input device coupled to the frame.

In an embodiment, the input device is configured to modulate a level of transparency of the transparency regulation element surrounding the pinhole.

In an embodiment, the input device is configured to modulate a size of the pinhole opening in response to an input.

There is also provided, in accordance with an embodiment of the invention, apparatus for use with a vision-enhancing instrument including one or more spectacle lenses and a frame, the apparatus including:

a magnification lens system coupled to at least one of the lenses;

a transparency regulation element having variable transparency, configured to enhance viewing through the magnification lens system; and a power unit, configured to supply voltage to the transparency regulation element.

The present invention will be more fully understood from the following detailed description of embodiments thereof, taken together with the drawings, in which:

BRIEF DESCRIPTION OF THE DRAWINGS

FIGS. 12A-E are schematic illustrations of a lens system comprising a prism, in accordance with respective embodiments of the present invention.

DETAILED DESCRIPTION OF EMBODIMENTS

Figure 1A:
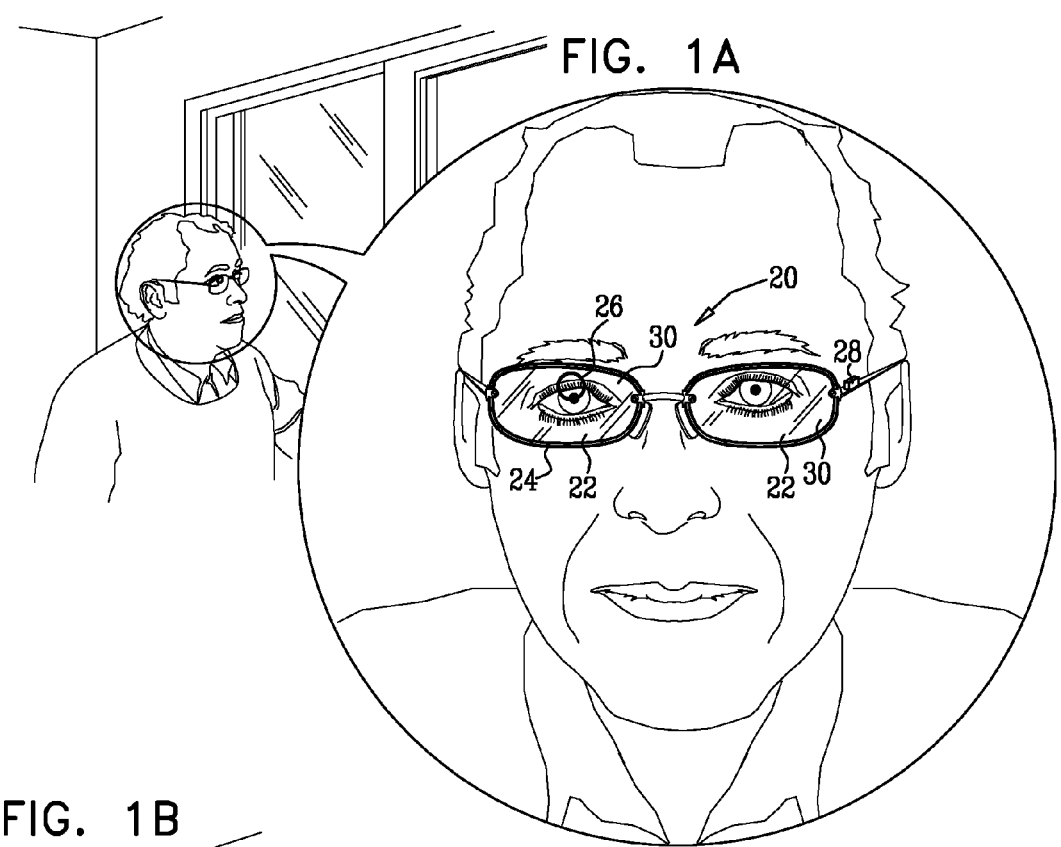
FIG. 1A is a schematic illustration of a magnification lens system and a transparency regulation element coupled to a spectacle lens, in a first state thereof, in accordance with an embodiment of the present invention.

Reference is now made to FIG. 1A, which is a schematic illustration of apparatus 20 comprising a magnification lens system 26 coupled to one of two spectacle lenses 22, and a transparency regulation element 30, in accordance with an embodiment of the present invention. Spectacle lenses 22 are held together by a frame 24 which comprises a power unit 28 configured to supply voltage to transparency regulation element 30. Magnification lens system 26 is used for viewing far objects. Alternatively, magnification lens system 26 is configured for viewing near objects. Spectacle lenses 22 are configured for viewing far objects and/or for viewing near objects, according to the needs of a given subject.

For some applications, magnification lens system 26 comprises a telescope, e.g., Galilean, Keplerian, catadioptric, or any other telescopic lens system known in the art. In some embodiments, magnification lens system 26 comprises at least one lens, e.g., an aspherical or amorphic lens, which is configured to enhance vision in subjects experiencing tunnel vision. The aspherical or amorphic lens helps the subject attain a wider range of peripheral vision.

It is to be noted that the proportions of magnification lens system 26 relative to the surrounding spectacle lens 22 may be greater than the proportions illustrated herein. For example, magnification lens system 26 may comprise a majority of spectacle lens 22.

In some embodiments, transparency regulation element 30 comprises a polymer, which is applied to lenses 22. Power unit 28 modulates a level of transparency of the polymer by driving the polymer to change a state thereof.

For some applications, transparency regulation element 30 comprises a tinting device, e.g., a liquid crystal device.

Transparency regulation element 30 is typically configured to assume a transparent state in the absence of voltage from power unit 28. Alternatively, the absence of voltage from power unit 28 darkens transparency regulation element 30, and a supply of voltage reduces a level of the darkening of transparency regulation element 30.

Typically, power unit 28 comprises a rechargeable battery. Alternatively, power unit 28 comprises a photovoltaic charger. For some applications, power unit 28 is configured to be actuated by a user input, such as a switch, a button, a touch sensitive panel, or a voice activation unit.

For some applications, power unit 28 comprises an angle-detection device configured to activate transparency regulation element 30 upon sensing a particular angle of frame 24 (e.g., head-forward 10-15 degrees for at least 2 seconds). In this embodiment, the location of magnification lens system 26 in an upper region of spectacle lens 22 typically involves a tilting of the head of the subject in order to look through magnification lens system 26. Upon detection of such tilting, transparency regulation element 30 decreases the level of background light passing through one or both spectacle lenses 22 in order to enhance viewing through magnification lens system 26.

When the subject no longer desires viewing through magnification lens system 26, the subject tilts the head out of the angle range described hereinabove, thereby deactivating transparency regulation element 30, and returning the one or both spectacle lenses 22 to a transparent state. Alternatively, the angle-detection device is configured to activate and maintain transparency regulation element 30 in an activated state upon sensing a particular angle of frame 24 (e.g., head-forward 10-15 degrees for at least 2 seconds). In this embodiment, subsequent tilting of the head in various positions does not affect the activated state of transparency regulation element 30. A subsequent input (e.g., tilt head-forward 10-15 degrees for at least 2 seconds) deactivates transparency regulation element 30.

For some applications, power unit 28 comprises an eye motion sensor configured to activate transparency regulation element 30 upon sensing a particular movement or disposition of an eye of the subject (e.g., staring through magnification lens system 26 for at least 2 seconds). Upon detection of such a motion or disposition, power unit 28 drives transparency regulation element 30 to decrease the level of background light that is allowed to pass through one or both spectacle lenses 22 in order to enhance viewing through magnification lens system 26.

When viewing through magnification lens system 26 is no longer desired, termination of staring through magnification lens system 26 (or another eye motion) deactivates transparency regulation element 30, returning the one or both spectacle lenses 22 to a transparent state.

Typically, power unit 28 comprises circuitry, such as a microcontroller, configured to process input from the angle detection device, the eye motion sensor, and/or another user input as described hereinabove. In response to the processing, the circuitry actuates power unit 28 to drive current through transparency regulation element 30.

Thus, for some applications, both spectacle lenses 22 are darkened, while for other applications transparency regulation element 30 is configured to substantially darken only the portions of spectacle lens 22 comprising magnification lens system 26, and not to darken the second of the two spectacle lenses 22. In some embodiments, transparency regulation element 30 is configured to be coupled only to spectacle lens 22 coupled to magnification lens system 26. Alternatively, transparency regulation element 30 is coupled to each spectacle lens 22 coupled to frame 24.

For some applications, apparatus described herein comprises a control unit (not shown) comprising a transmitter and/or a receiver. The control unit is typically disposed at a remote location with respect to frame 24 of apparatus 20. For some applications, the control unit is integrated into an earpiece. The control unit communicates with power unit 28 by transmitting commands to a receiver in power unit 28, and/or receiving information transmitted by a transmitter in power unit 28. Such transmissions may use a proprietary wireless protocol, or may use a standard known in the art, such as Bluetooth. For some applications, the control unit comprises the angle-detection device described hereinabove.

In some embodiments, the control unit, frame 24, and/or power unit 28 comprises a sensor, e.g., optical, infrared, ultrasound, and/or radiofrequency, configured for targeted near/far switching to activate and deactivate transparency regulation element 30 accordingly. Typically, the sensor transmits a command to power unit 28 to drive transparency regulation element 30 to darken portions of lens 22 (e.g., portions of lens 22 not containing magnification lens system 26 or portions of lens 22 containing magnification lens system 26). For example, upon sensing a transmission from a near object, the power unit may drive the transparency regulation element to darken portions of lens 22 configured for viewing far objects, and vice versa. For some applications, in which a subject desires to read from a computer monitor positioned at a certain distance from the subject, when the subject directs his or her head towards the monitor, the sensor senses a signal (e.g., an infrared signal) generated by a signal generator positioned in a vicinity of the monitor (e.g., coupled to the monitor). Responsively to receiving the signal, power unit 28 drives transparency regulation unit 30 to darken portions of lenses 22 not having the correct level of focusing or magnification for viewing the monitor, e.g., the portions of lenses 22 containing magnification lens system 26, or the portion of bifocal lenses not having an appropriate focal length for viewing the monitor.

In an embodiment of the present invention, the control unit, frame 24, and/or power unit 28 comprises a transmitter and a receiver. A reflective surface is coupled to a viewing target, e.g., a location on a body of a patient during surgery, or a computer monitor. When the subject directs apparatus 20 toward the target, a signal transmitted from the transmitter is reflected from the reflective surface and received by the receiver of the control unit, frame 24 and/or power unit 28. Responsively thereto, power unit 28 activates or deactivates transparency regulation element 30 accordingly. For example, the portions of lenses 22 not containing magnification lens system 26 may be darkened when the subject orients apparatus 20 toward the target to which the reflective surface is coupled.

In an embodiment of the present invention, the control unit, frame 24, and/or power unit 28 comprises a distance sensor, which is configured to sense a distance between apparatus 20 and a viewing target, and generate a distance signal responsively thereto. Responsively to distance signal, power unit 28 automatically switches between activated and deactivated states of transparency regulation element 30, based on sensing the presence and/or a distance of an object being viewed by the subject at any given time. The distance sensor typically uses distance sensing techniques known in the art, such as are used for auto-focusing of cameras (e.g., using reflected ultrasound or infrared signals, phase detection, or contrast measurement).

Figure 1B:
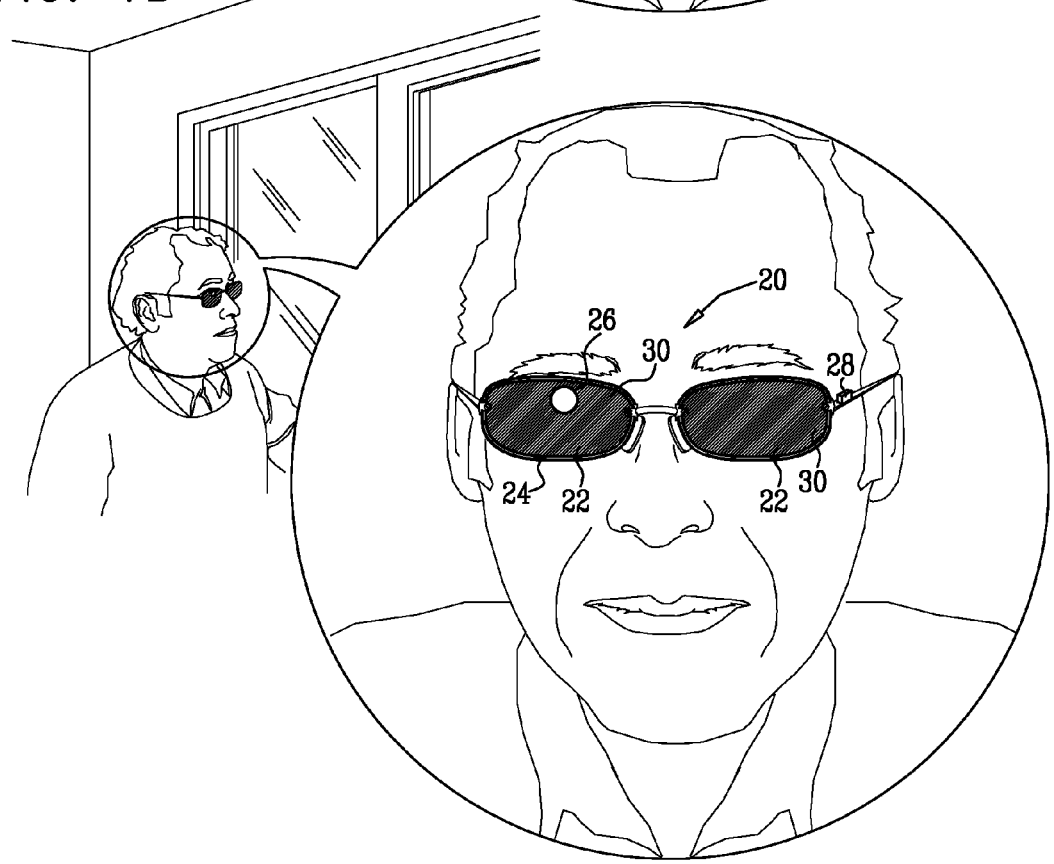
FIG. 1B is a schematic illustration of the magnification lens system and transparency regulation element of FIG. 1A, in a second state thereof, in accordance with an embodiment of the present invention.

Reference is now made to FIG. 1B, which is a schematic illustration of apparatus 20, as described hereinabove with reference to FIG. 1A, showing transparency regulation element 30 shown in its activated state, in accordance with an embodiment of the present invention. Voltage from power unit 28 drives transparency regulation element 30 to substantially darken portions of spectacle lens 22 not containing magnification lens system 26, reducing background light interfering with viewing through magnification lens system 26. Additionally, transparency regulation element 30 substantially darkens the additional spectacle lens 22 not coupled to magnification lens system 26.

Figure 2:
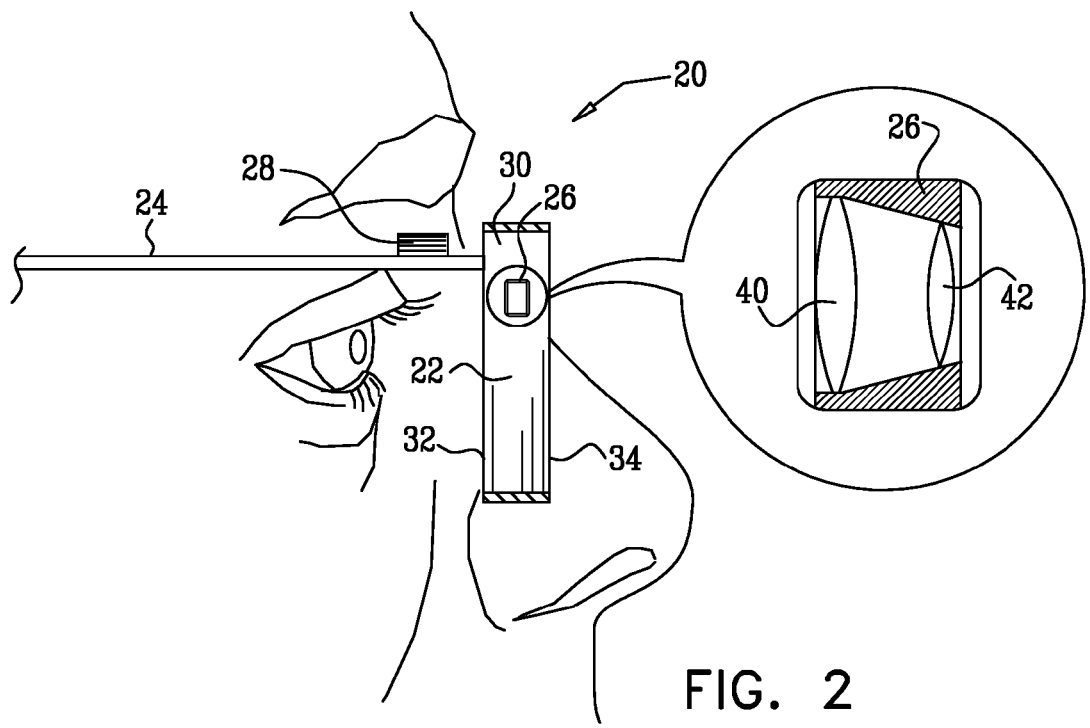
FIG. 2 is a schematic side-view illustration of a transparency-regulated magnification lens system, in accordance with an embodiment of the present invention.

Reference is now made to FIG. 2, which is a schematic illustration of a side-view of apparatus 20, in accordance with an embodiment of the present invention. Spectacle lens 22 comprises an inner surface 32, and an outer surface 34, with respect to the subject wearing the spectacles, as described hereinbelow. Magnification lens system 26 comprises an ocular lens 40 and an objective lens 42, or is otherwise configured using techniques known in the art.

Figure 3:
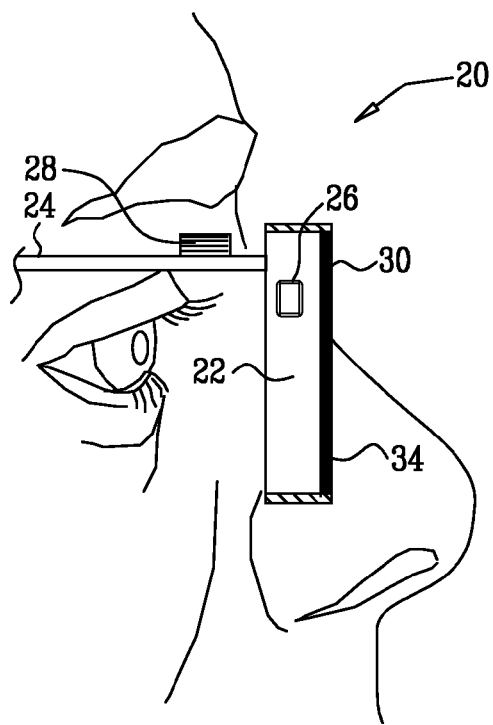
FIG. 3 is a schematic side-view illustration of another configuration of the transparency-regulated magnification lens system of FIG. 2, in accordance with an embodiment of the present invention.

Reference is now made to FIG. 3, which is a schematic illustration of a side-view of apparatus 20, in accordance with an embodiment of the present invention. Transparency regulation element 30 is configured to be disposed on outer surface 34 of spectacle lens 22 while magnification lens system 26 is configured to be embedded within spectacle lens 22 (as shown), or elsewhere. Power unit 28, coupled to frame 24, is activated by the subject in a manner as described hereinabove, with reference to FIG. 1A, such that it drives transparency regulation element 30 to substantially darken portions of spectacle lens 22 not containing magnification lens system 26. Magnification lens system 26 is disposed in an upper region of spectacle lens 22, enabling convenient activation of transparency regulation element 30 by, for example, the angle-detection device characterizing power unit 28.

Figure 4:
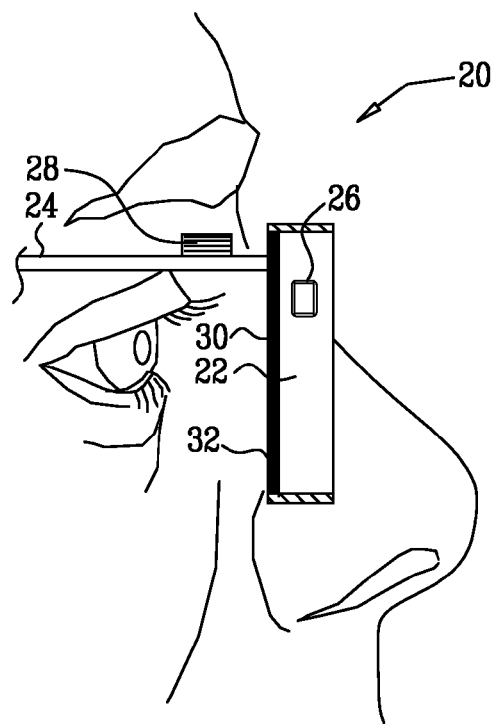
FIG. 4 is a schematic side-view illustration of yet another configuration of the transparency-regulated magnification lens system of FIG. 2, in accordance with an embodiment of the present invention.

Reference is now made to FIG. 4, which is a schematic illustration of a side-view of apparatus 20, in accordance with an embodiment of the present invention. In this embodiment, apparatus 20 is generally configured as described hereinabove with reference to FIG. 3, except that transparency regulation element 30 is disposed on inner surface 32 of spectacle lens 22.

Figure 5A:
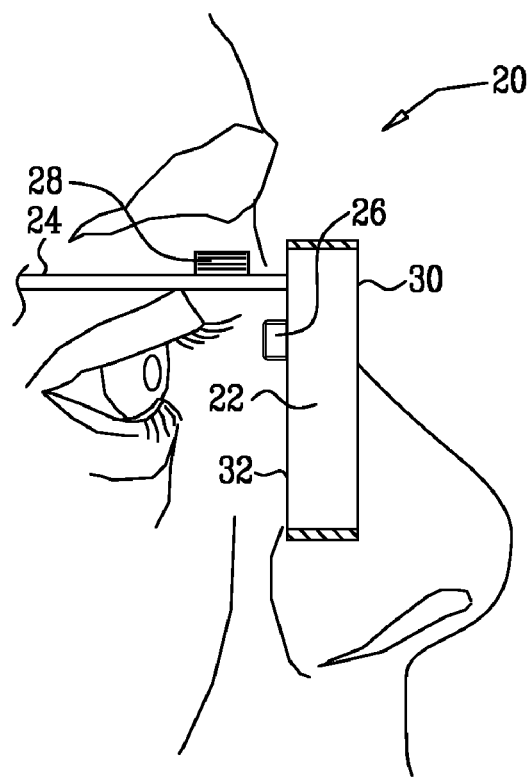
FIGS. 5A-B are schematic side-view illustrations of additional configurations of the transparency-regulated magnification lens system of FIG. 2, in accordance with respective embodiments of the present invention.

Reference is now made to FIG. 5A, which is a schematic illustration of apparatus 20, in accordance with an embodiment of the present invention. In this embodiment, apparatus 20 is generally configured as described hereinabove with reference to FIG. 3, except that magnification lens system 26 protrudes from inner surface 32 of spectacle lens 22, towards the subject. Magnification lens system 26 typically protrudes less than about 4 mm, and has a diameter of about 3-15 mm (e.g., 8 mm). Magnification is typically between about 2× and about 10×, e.g., 3×-4×. It is noted that these parameters are described by way of illustration and not limitation.

Figure 5B:
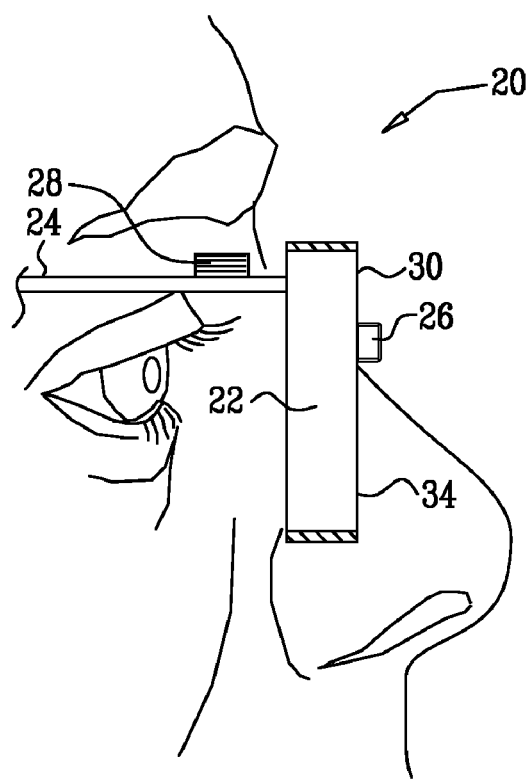

Reference is now made to FIG. 5B, which is a schematic illustration of apparatus 20, in accordance with an embodiment of the present invention. In this embodiment, apparatus 20 is generally configured as described hereinabove with reference to FIG. 5A, except that magnification lens system 26 is disposed on outer surface 34 of spectacle lens 22 and is configured to protrude from spectacle lens 22 away from the subject.

Figure 6A:
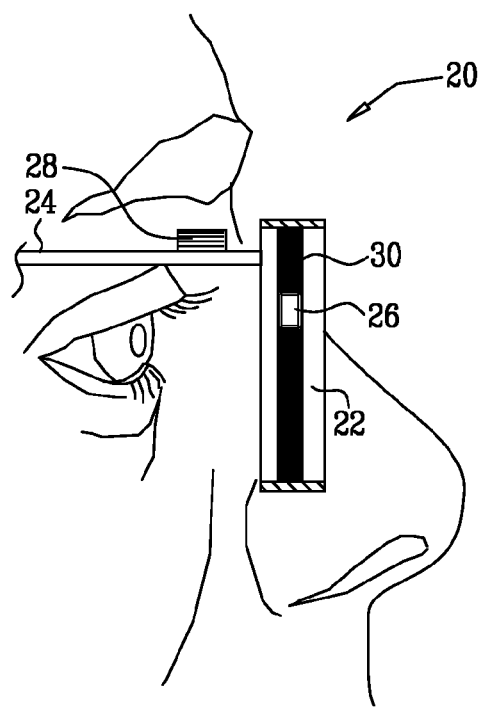
FIGS. 6A-C are schematic side-view illustrations of yet additional configurations of the transparency-regulated magnification lens system of FIG. 2, in accordance with respective embodiments of the present invention.

Reference is now made to FIG. 6A, which is a schematic illustration of apparatus 20, in accordance with an embodiment of the present invention. In this embodiment, apparatus 20 is generally configured as described hereinabove with reference to FIG. 3, except that both transparency regulation element 30 and magnification lens system 26 are embedded within spectacle lens 22.

Figure 6B:
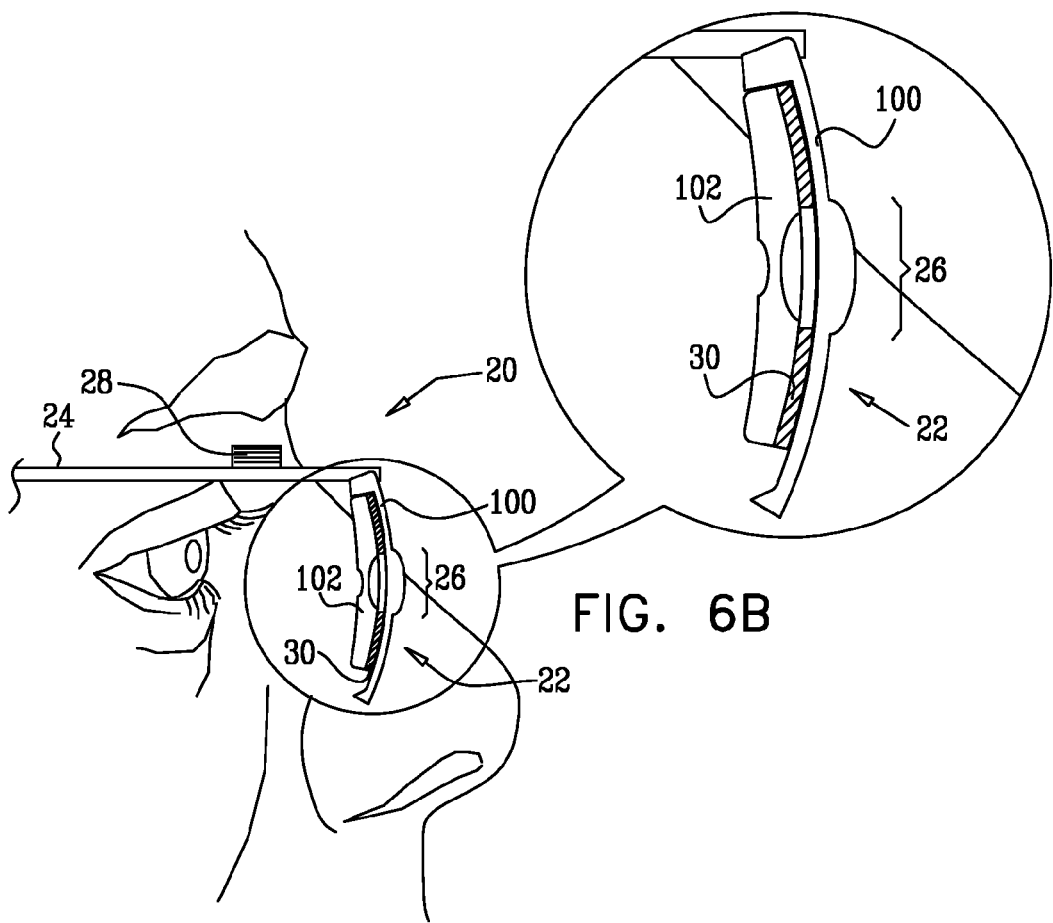

Reference is now made to FIG. 6B, which is a schematic illustration of apparatus 20, in accordance with an embodiment of the present invention. In this embodiment, apparatus is generally configured as described hereinabove with reference to FIG. 6A, with the exception that spectacle lens 22 comprises a proximal lens element 102 (with respect to the eye of the subject) and a distal lens element 100. In this embodiment, a portion of proximal lens element 102 and a portion of distal lens element 100 are shaped so as to define magnification lens system 26, as shown in the figure. Transparency regulation element 30 is disposed between inner lens 102 and outer lens 100.

Although magnification lens system 26 is illustrated in the middle of proximal lens element 102 and distal lens element 100, it is to be understood that alternative portions of lens elements 100 and 102 (e.g., the upper portions of lens elements 100 and 102) can be shaped to define magnification lens system 26, configured to the needs of the subject, as well.

Figure 6C:
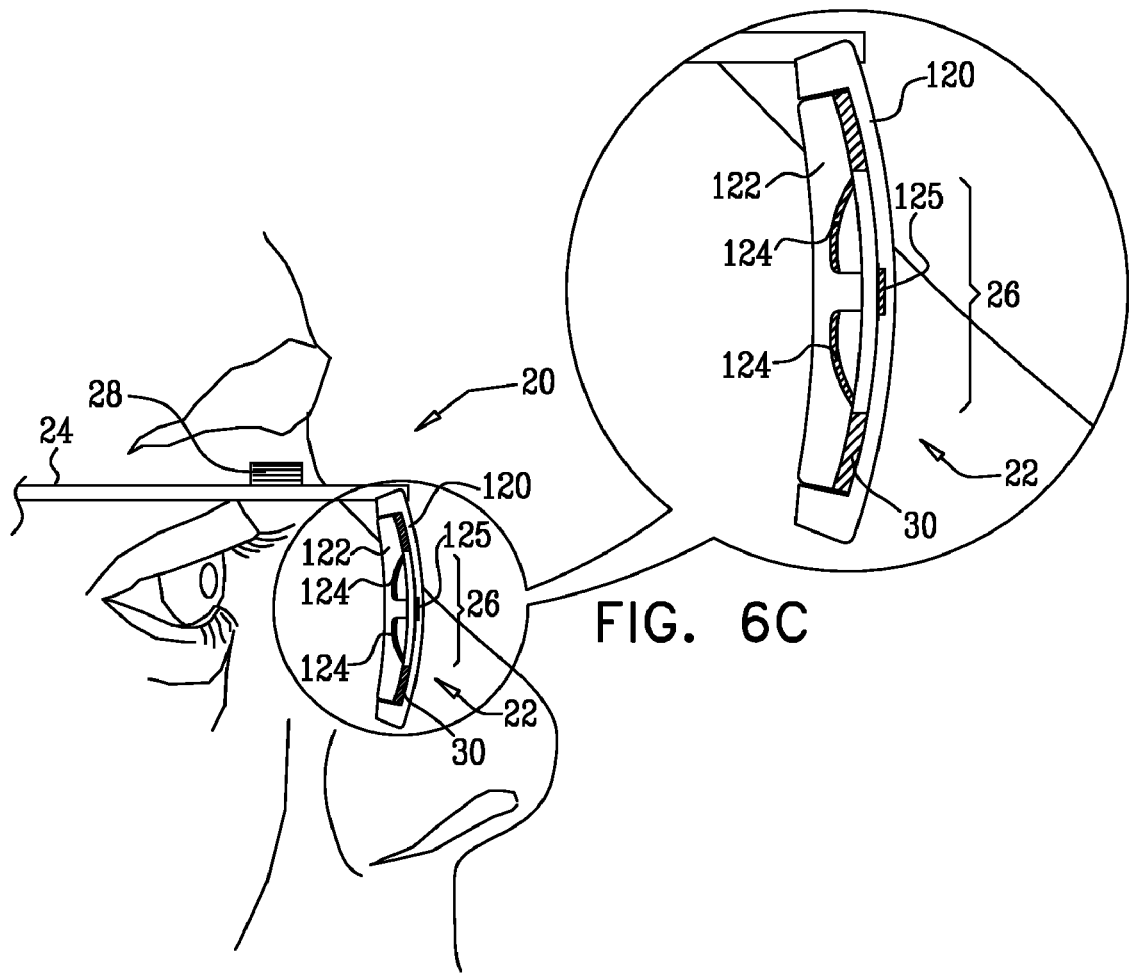

Reference is now made to FIG. 6C, which is a schematic illustration of apparatus 20, in accordance with an embodiment of the present invention. In this embodiment, apparatus 20 is generally configured as described hereinabove with reference to FIG. 6B, except that magnification lens system 26 comprises a catadioptric telescope. A distal lens element 120 (with respect to the eye of the subject) is shaped to define a portion of magnification lens system 26 and comprises a mirror 125 at its proximal end. A proximal lens element 122 is shaped to define a portion of magnification lens system 26, and comprises mirrors 124 at its distal end. Mirror 125 is configured to focus rays of light reflecting off of mirrors 124 of proximal lens element 122.

Figure 7:
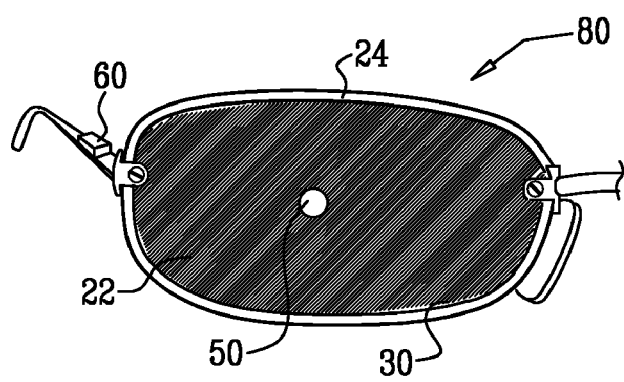
FIG. 7 is a schematic illustration of a transparency regulation element comprising a pinhole opening, in accordance with an embodiment of the present invention.

Reference is now made to FIG. 7, which is a schematic illustration of apparatus 80 comprising spectacle lens 22 coupled to transparency regulation element 30, in accordance with an embodiment of the present invention. Transparency regulation element 30 is configured to provide a pinhole opening 50 for light passage through spectacle lens 22. The subject looks through pinhole 50 of transparency regulation element 30, whose effect is to generally provide pinhole focusing as known in the art. Visual acuity is enhanced when transparency regulation element 30 substantially darkens spectacle lens 22, blocking peripheral rays, while pinhole 50 allows passage of only those rays which traverse the central portion of the pupil. Frame 24 of apparatus 80 comprises an input device 60 configured to modulate a level of transparency of transparency regulation element 30 surrounding pinhole 50. Input device 60 is further configured to modulate the size of pinhole 50. Input device 60 typically comprises a user input such as a switch, a button, a touch sensitive panel, a voice activation unit, an eye motion sensor, or an angle-detection device.

Figure 8:
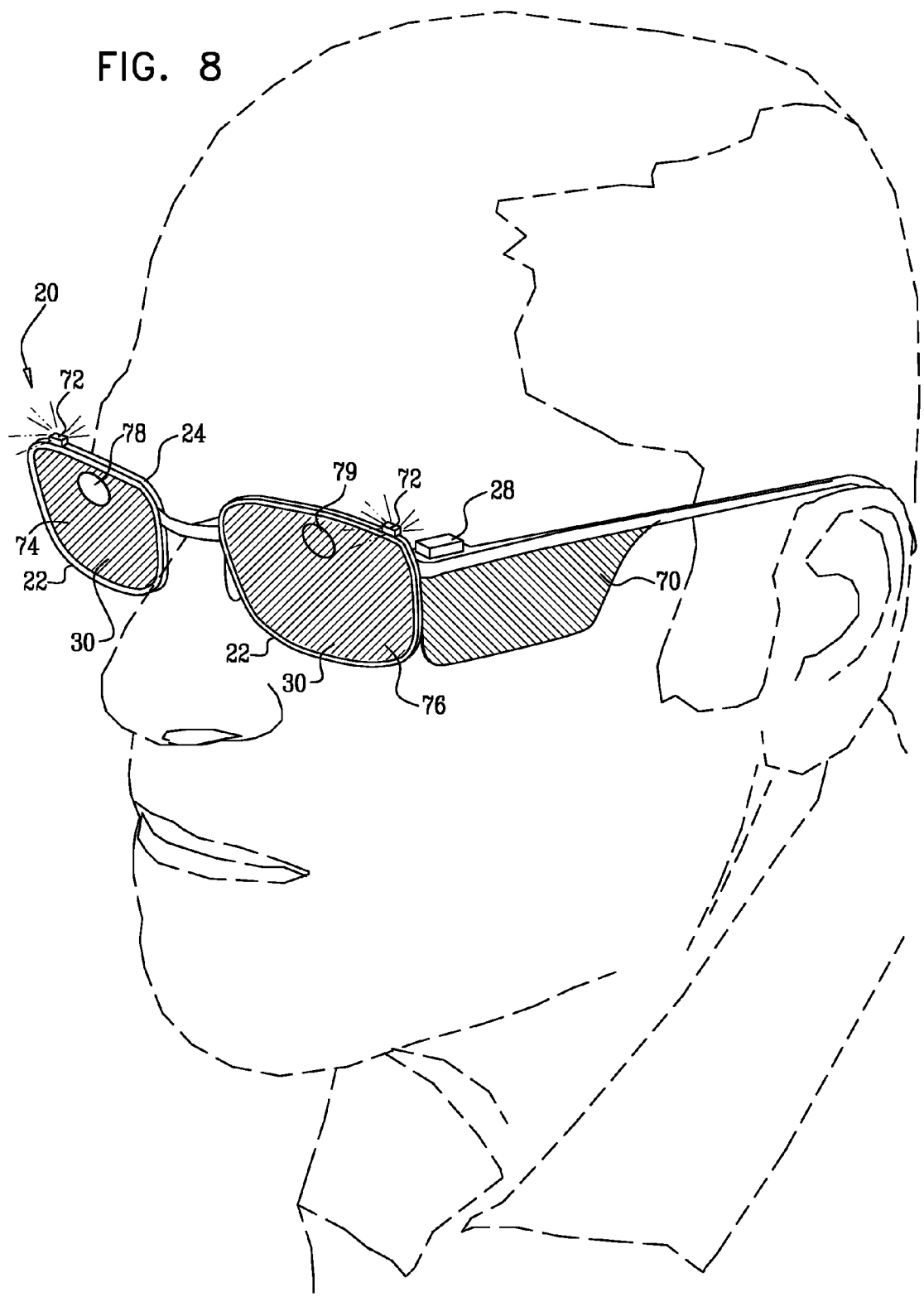
FIG. 8 is a schematic illustration of a dual transparency-regulated magnification lens system, in accordance with an embodiment of the present invention.

Reference is now made to FIG. 8, which is a schematic illustration of apparatus 20 comprising a first magnification lens system 78 and a second magnification lens system 79, configured for viewing objects at respective distances, in accordance with an embodiment of the present invention. Frame 24 is optionally coupled to a light source 72 as well as power unit 28, configured to activate transparency regulation element 30, generally as described hereinabove. A first lens 74 of spectacle lenses 22 comprises first magnification lens system 78 and a second lens 76 of spectacle lenses 22 comprises second magnification lens system 79. When it is desired to view through first magnification lens system 78 of first lens 74, transparency regulation element 30 substantially darkens portions of first lens 74 not comprising first magnification lens system 78. Typically, but not necessarily, transparency regulation element 30 substantially darkens the entirety of second lens 76 comprising second magnification lens system 79, allowing for light passage only through first magnification lens system 78. In combination with darkening effected by transparency regulation element 30, side-blinders 70 are typically coupled to either side of frame 24, configured to reduce background light and prevent glare from affecting viewing through magnification lens system 78. Consequently, viewing through magnification lens system 78 is enhanced. When it is desired to view through second magnification lens system 79, this protocol with suitable changes is utilized.

Figure 9:
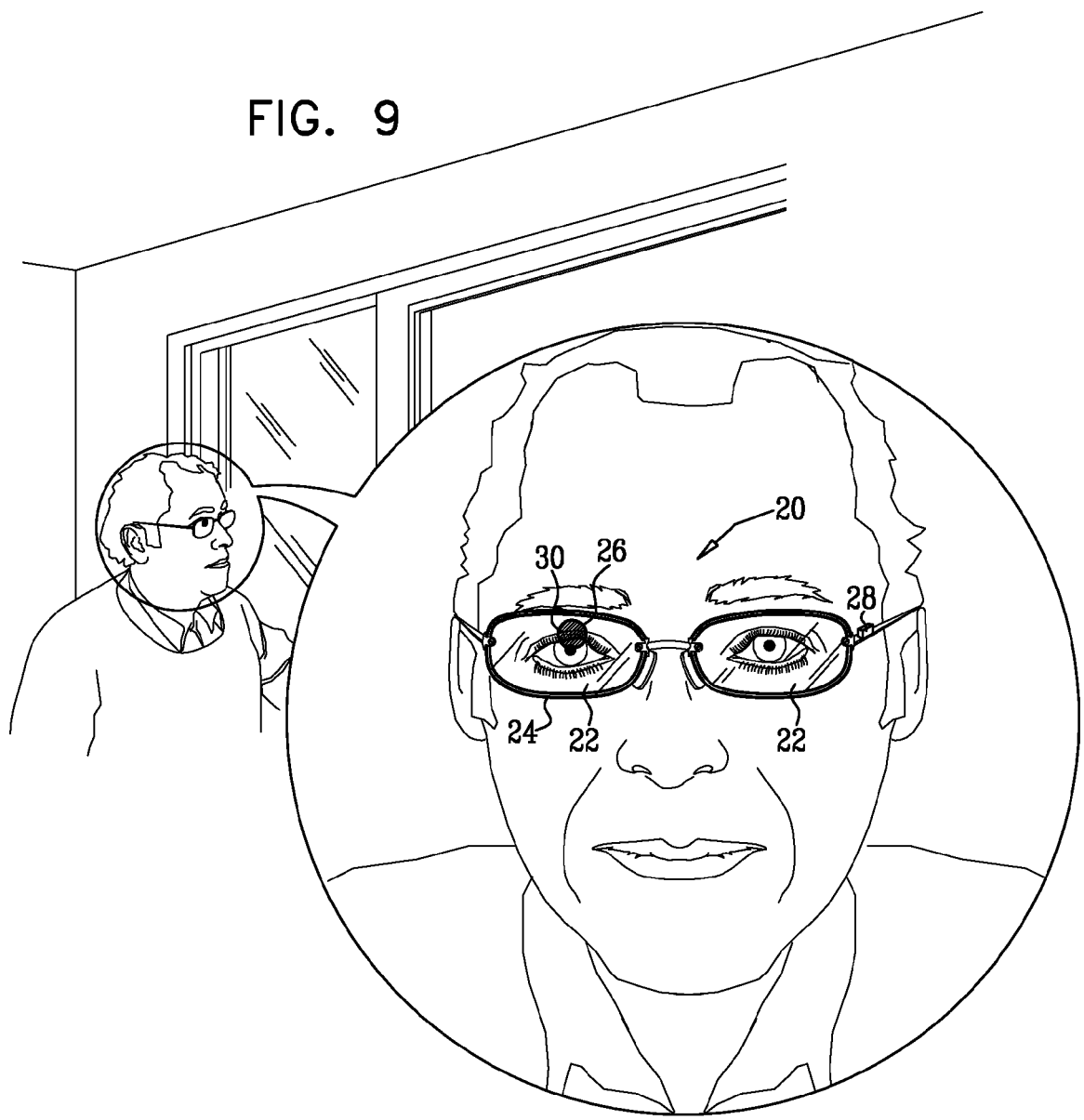
FIG. 9 is a schematic illustration of a transparency-regulated magnification lens system, in accordance with an embodiment of the present invention.

Reference is now made to FIG. 9, which is a schematic illustration of apparatus 20 comprising transparency regulation element 30 and magnification lens system 26 coupled to one of two spectacle lenses 22, in accordance with an embodiment of the present invention. When viewing through magnification lens system 26 is not desired, power unit 28 drives transparency regulation element 30 to substantially darken portions of spectacle lens 22 through which light would otherwise enter or exit magnification lens system 26. Transparency regulation element 30 is typically configured to substantially darken only these portions of spectacle lens 22, while permitting light to pass through other portions of spectacle lens 22 to facilitate normal (i.e., not magnification lens system-facilitated) vision. This embodiment may be practiced in combination with or separately from the embodiments described hereinabove with reference to FIGS. 1-6 and 8.

Reference is now made to FIG. 1A, which is a schematic illustration of an apparatus 90 wherein spectacle lenses 22 comprise a two-lens system, in accordance with an embodiment of the present invention. An upper region 60 of spectacle lens 22, which is configured for viewing objects at a far distance from the subject, is positioned over a lower region 62, configured for viewing near objects. (Alternatively, upper region 60 is configured for viewing near objects, and lower region 62 is configured for viewing far objects.) Upon activation by power unit 28, in a manner as described hereinabove with reference to FIG. 1A, transparency regulation element 30 substantially darkens lower region 62 of spectacle lens 22, thereby enhancing visual acuity through upper region 60 of spectacle lens 22 by reducing unnecessary light. For some applications, one or both of upper and lower regions 60 and 62 comprise multifocal lenses, as is known in the art.

Figure 10A:
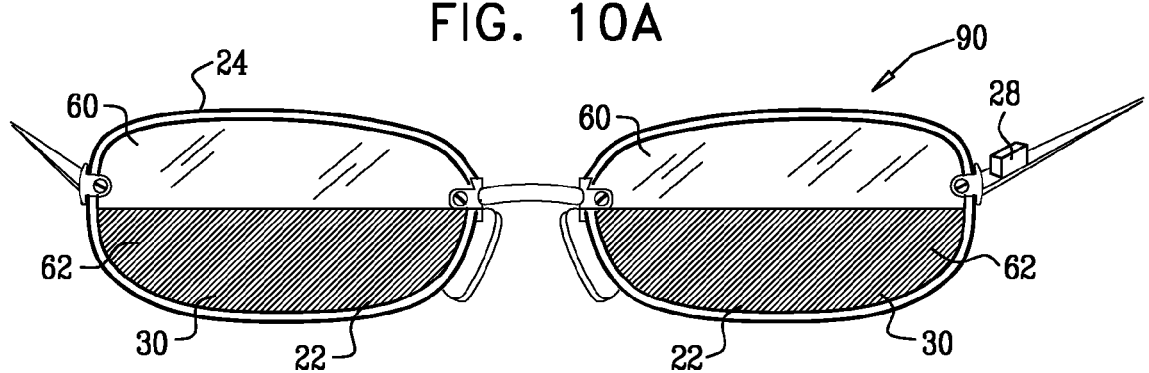
FIGS. 10A-10B are schematic illustrations of a transparency regulation element, in respective first and second states thereof, in accordance with an embodiment of the present invention.
Figure 10B:
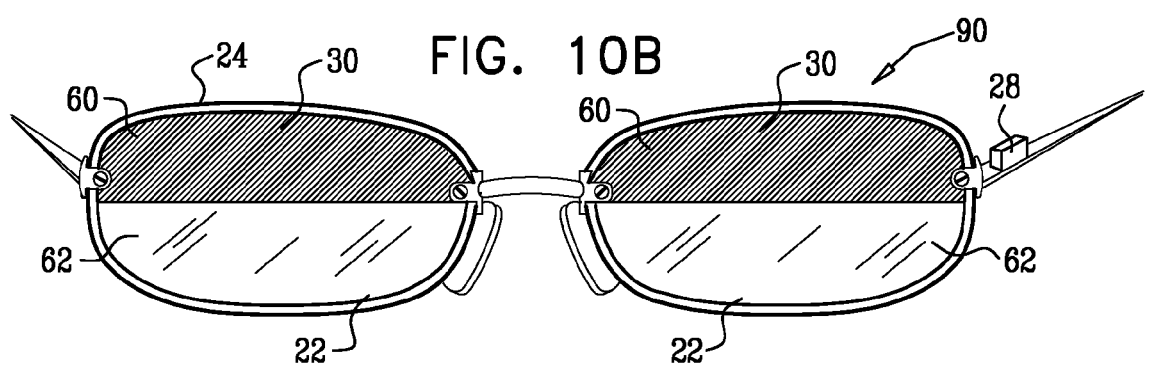

Reference is now made to FIG. 10B, which is a schematic illustration of apparatus 90 as described hereinabove with reference to FIG. 1A, in which upper region 60 is substantially darkened by transparency regulation element 30, in accordance with an embodiment of the present invention. In this embodiment, enhanced visual acuity through lower region 62 of spectacle lens 22 is achieved.

Figure 10C:
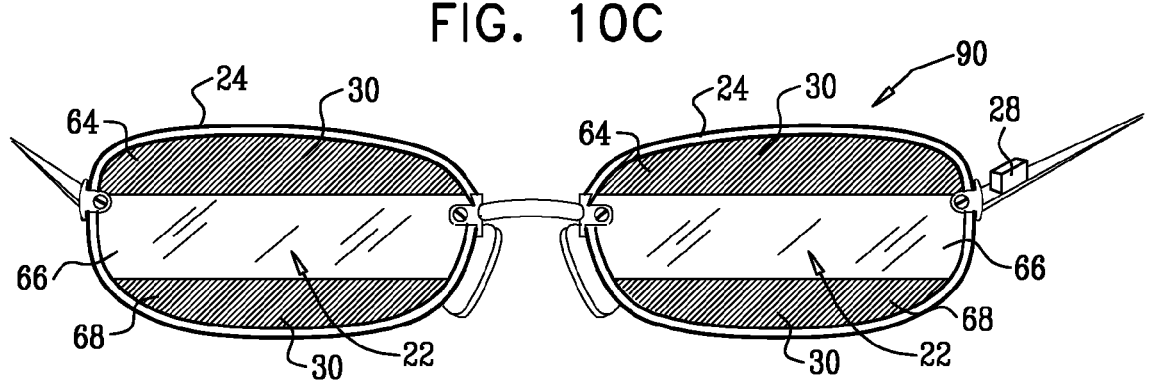
FIG. 10C is a schematic illustration of a transparency regulation element, in accordance with another embodiment of the present invention.

Reference is now made to FIG. 10C, which is a schematic illustration of apparatus 90, in accordance with an embodiment of the present invention. In this embodiment, apparatus 90 is generally configured as described hereinabove with reference to FIGS. 11A and 10B, except that lens 22 is subdivided into three distinct regions (i.e., upper 64, middle 66, and lower 68 regions). When the subject desires to view objects at a first distance thereof, upper region 64 and lower region 68 are substantially darkened by transparency regulation element 30 in order to enhance visual acuity through middle region 66.

When the subject desires to view objects at a second distance thereof, middle region 66 is substantially darkened by transparency regulation element 30. Embodiments in which middle region 66 is darkened allow for enhanced visual acuity through upper and lower regions 64 and 68 during vertical eye movement of the subject. In some embodiments (as described hereinbelow with reference to FIGS. 12A and 12B), at least one of upper region 64 and lower region 68 comprises a prism which enhances acuity through regions 64 and 68 when the objects are viewed above and below the subject, respectively.

Figure 11A:
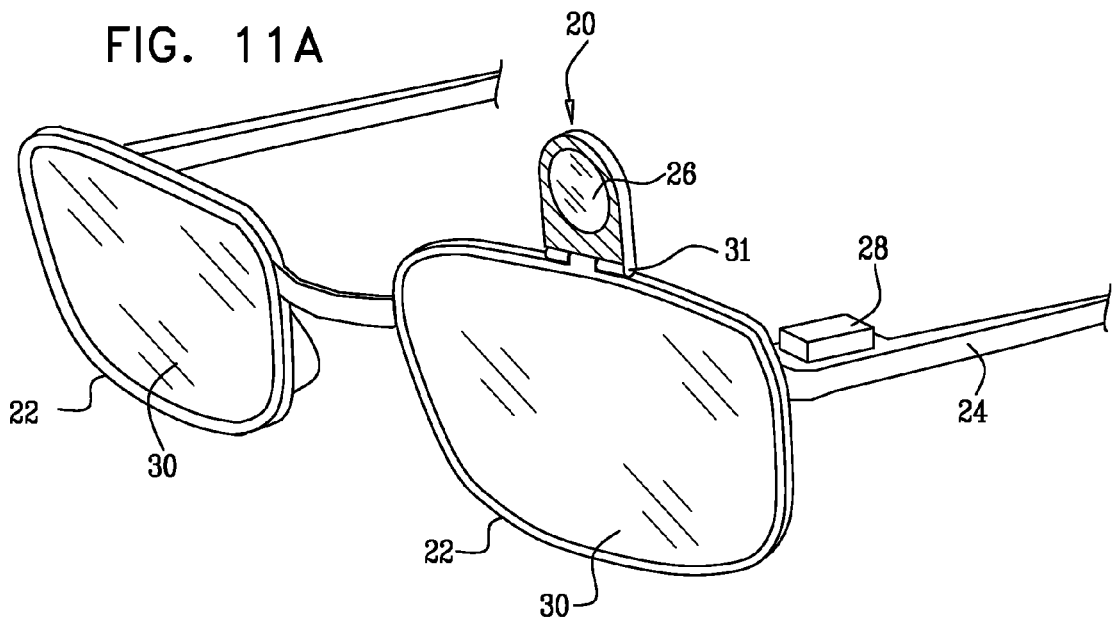
FIGS. 11A and 11B are schematic illustrations of the magnification lens system of FIGS. 1-6C and 8-9, in accordance with respective embodiments of the present invention.
Figure 11B:
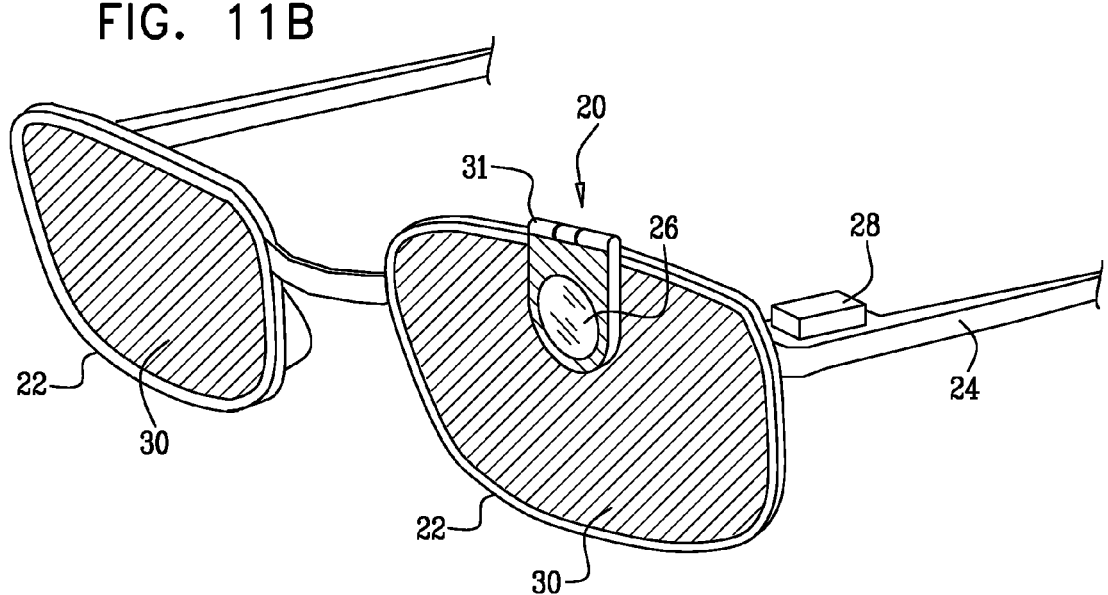

Reference is now made to FIGS. 11A and 11B, which are schematic illustrations of magnification lens system 26 coupled to spectacle lens 22 by being disposed directly upon a portion of frame 24, in accordance with an embodiment of the present invention. Magnification lens system 26 is shown on a portion of frame 24 surrounding one of two spectacle lenses 22, by way of example. For some applications, a first magnification lens system 26 is disposed upon a portion of frame 24 coupled to one of two spectacle lenses 22, and a second magnification lens system (not shown) is disposed upon a second portion of frame 24 coupled to a second of two spectacle lenses 22.

A pivot 31 couples magnification lens system 26 to frame 24 and enables magnification lens system 26 to be aligned with the eye of the subject and with an object being viewed. Once magnification lens system 26 has pivoted over the one of two spectacle lenses 22 (as shown in FIG. 11B), transparency regulation element 30 darkens, typically automatically, at least a portion of that lens not containing magnification lens system 26, as described hereinabove, as well as the other lens.

As shown in FIG. 11A, rotating magnification lens 26 to a location directly above frame 24 allows for unobstructed vision through spectacle lenses 22 when viewing through magnification lens system 26 is not desired.

Reference is now made to FIGS. 12A-E, which are schematic illustrations of a prism-compensating apparatus 110 comprising spectacle lens 22 and a prism 130, in accordance with respective embodiments of the present invention. Prism 130 is configured to provide a wider scope of vision, e.g., upwards and downwards, such as for subjects limited in their visual range or eye movement, and/or to allow such subjects to direct their vision in a direction they could not otherwise achieve. Such wider scope of vision and/or vision direction facilitates walking, balance, and gait improvement, and/or improved reading, writing, typing, and computer use. During viewing of the subject through prism 130, power unit 28 drives transparency regulation element 30 to substantially darken the portions of lens 22 not containing prism 130, as described hereinabove, thereby enabling enhanced visual acuity through prism 130. Optionally, when the subject is using the portions of the lens not containing the prism, the prism is substantially darkened by the transparency regulation element. For some applications, prism 130 comprises one of the prisms described hereinbelow with reference to FIGS. 12C-E. Alternatively, the prism comprises another type of prism known in the art, such as an anamorphic prism or a roof prism. Alternatively, apparatus 110 comprises one or more mirrors that are arranged to enable downward or upward vision.

As shown in FIG. 12A, prism 130 comprises a downward-viewing prism which enables downward vision for a subject who suffers from inferior altitudinal hemianopia or vertical eye movement disorder. Typically, respective prisms 130 on each spectacle lens 22 have the same diopter, e.g., 3 to 4 prism diopter, to maintain convergence. In some embodiments, a plurality prisms 130 having differing diopters are used to correct a preexisting misconvergence in both eyes of the subject. For some applications, only one of the spectacle lenses comprises a prism.

FIG. 12B shows prism 130 compensating for superior altitudinal hemianopia or vertical eye movement disorder. Prism 130 enables the subject to see upwards. Alternatively, for some applications, the prism in this lower position is configured for enhanced downward viewing.

Reference is again made to FIGS. 12A-B. It is to be noted that prism 130 is placed in upper and lower portions of lens 22 by way of illustration and not of limitation, and that prism 130 may be located at any suitable point on lens 22. For example, prism 130 may align longitudinally with respect to lens 22 in order to treat bitemporal hemianopia. Prism 130 may be positioned relative to lens 22 at any suitable location in order to treat eye movement disorders such as disconjugate (convergence and divergence), gaze palsy, or nystagmus (horizontal, vertical, or rotational). Alternatively or additionally, prism 130 may be positioned relative to lens 22 at any suitable location in order to treat visual field defects such as homonymous hemianopia, quadrantanopia, superior altitudinal hemianopia, inferior altitudinal hemianopia, bitemporal hemianopia, binasal hemianopia, central scotoma, and/or concentric constriction.

In an embodiment of the present invention, prism-compensating apparatus 110 comprises a downward-viewing prism which power unit 28 is configured to intermittently activate during walking by the subject. Subjects suffering from Parkinson's disease and other eye movement disorders sometimes have difficulty looking at the ground while walking. The techniques of this embodiment thus help such subjects intermittently see the ground and improve their walking. A portion of the time the subject is walking, transparency regulation element darkens the region containing lens 22, thus enhancing the subject's downward vision through prism 130. For some applications, a portion of the time the subject is walking, transparency regulation element 30 substantially darkens prism 130, thus allowing the subject to see ahead. Alternatively, the transparency element does not darken the prism. For some applications, apparatus 110 comprises a motion sensor that senses forward movement of the subject during walking. The power unit is configured to activate the transparency regulation element 30 to darken the region containing lens 22 when the subject stops walking between steps, thereby enabling downward vision through prism 130 so the subject can better coordinate his next step. Alternatively, the motion sensor deactivates transparency regulation element 30 when the subject is walking to enable the subject to look downward. For some applications, the power unit periodically activates the transparency regulation element, such as at regular (e.g., predetermined) intervals, e.g., once every certain number of seconds, such as once every two to thirty seconds.

FIG. 12C shows a wedge prism 131 which refracts a light beam 132. In an embodiment of the present invention, prism 130 comprises prism 131. Typically the subject gazes straight into prism 131 and is able to see objects positioned at a suitable angle generally below an eye level of the subject.

FIG. 12D is a schematic illustration of prism 130 comprising a right angle prism 133 whose total internal reflectance redirects beam 132 at 90 degrees from the incident direction, in accordance with an embodiment of the present invention. Thus, the subject is capable of viewing directly downward.

FIG. 12E is a schematic illustration of prism 130 comprising a pentaprism 135 which redirects beam 132 by 90 degrees by reflecting beam 132 twice therein, in accordance with an embodiment of the present invention. Alternatively, apparatus 110 comprises a pentamirror.

Reference is again made to FIGS. 10A-C and 12A-B. It is to be noted that the proportions of regions 60, 62, 64, 66, and 68 (FIGS. 10A-C) and of spectacle lens 22 and prism 130 (FIGS. 12A-B) are by way of illustration not limitation. For example, proportions other than a 1:1 ratio may be used, e.g., 2:1.

It is to be noted that the transparency regulation element, described hereinabove, is typically configured to enhance viewing through the magnification lens system by enhancing visual acuity through the magnification lens system. Alternatively or additionally, the transparency regulation element is configured to restrict or minimize simultaneous viewing of peripheral objects, e.g., objects not directly viewed through the magnification lens system.

It is to be noted that the transparency regulation element, described in some embodiments hereinabove, is not limited to be coupled to only one lens. Additionally, the transparency regulation element is not limited to be coupled only to the lens which comprises the magnification lens system.

Although magnification lens systems are described in some embodiments as being placed in an upper region of one or two spectacle lenses, it is to be understood that the devices described herein can be placed at other sites of one or both spectacle lenses, configured to the needs of the subject, as well. For example, magnification lens systems may be placed at a lower region of the spectacle lens. Furthermore, a single spectacle lens may contain one magnification lens system for viewing far objects, as well as a magnification lens system for viewing near objects. Alternatively, both spectacle lenses may each contain one magnification lens system. Further alternatively, both spectacle lenses may each contain two magnification lens systems.

Although the transparency regulation elements are described in some embodiments as being coupled only to the lens containing the magnification lens system, it is to be understood that the transparency regulation element may be configured to be coupled to any additional lens of the vision-enhancing instrument not containing a magnification lens system.

It is to be understood that use of a transparency regulation element is described herein by way of illustration and not limitation, and that the scope of the present invention includes the use of other apparatus for controlling the darkness of a lens.

For some applications, the transparency regulation elements described hereinabove are configured to have a range of levels of transparency (i.e., to provide variable transparency). Thus, variable transparency described hereinabove may include only two choices (maximal darkening and maximal transparency), or a generally continuous range of darkening (e.g., in various shades of gray).

In some embodiments of the present invention, the transparency regulation element is coupled to a sensor responsive to the amount of light present in a given area. In response to the sensed surrounding light level, the light sensor actuates the transparency regulation element to adjust a level of transparency thereof. Thus, in effect, the transparency regulation element provides sunglasses whose transparency is regulated actively by the sensor. In some embodiments of the present invention, the variable transparency described herein may be associated with the portions of the lens not substantially darkened by the transparency regulation element (i.e., the portions of the lens through which the subject views). Thus, while portions of the lens are substantially darkened by the transparency regulation element, other portions of the lens are partially darkened responsively to the level of surrounding light sensed by the sensor.

In some embodiments of the present invention, spectacle lenses 22 and/or magnification lens system 26 are coated with a coating, e.g., a hydrophobic, anti-glare, polarized, UV filter, anti-reflecting, anti-aberration, scratch resistant, electrochromatic, photochromatic, impact resistance, mirror coating, polycarbonate, and/or high index (e.g., 1.5-1.89) coating.

For some applications, the vision-enhancing instruments comprising magnification lens system 26, prism 130, and/or transparency regulation element 30 described herein are used to enhance the vision of subjects experiencing various eye conditions such as myopia, hyperopia, astigmatism, and presbyopia.

It is to be noted that spectacle lens 22 and telescope 26 may comprise any form of lens which enhances the vision of the subject, e.g., amorphic lens systems, aspherical lens systems, magnification lens, diffractive lenses, reading telescopic systems, microscopic systems, prismatic systems, bifocal systems, multifocal systems, and/or any other vision-enhancing system known in the art. Any suitable combination of types of spectacle lens 22 and telescope 26 may be provided, such as according to the needs of a given subject.

For some applications, techniques described herein are practiced in combination with techniques described in one or more of the references cited in the Background section and Cross-References section of the present patent application. All references cited herein, including patents, patent applications, and articles, are incorporated herein by reference.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus comprising:
   a frame configured to be worn on a face of a subject, such that a portion of the frame is located in front of a first eye of the subject and not in front of a second eye of the subject;
   a first lens system coupled to the portion of the frame, the first lens system comprising one or more first lenses;
   a second lens system coupled to the portion of the frame, the second lens system comprising one or more second lenses;
   a transparency regulation element coupled to the first lens system, the transparency regulation element having variable transparency, and configured to enhance viewing through the second lens system; and
   a power unit coupled to the frame, configured to:
   during a first period, drive the transparency regulation element to darken the first lens system without substantially darkening at least a portion of the second lens system, and
   during a second period after the first period, not drive the transparency regulation element to darken the first lens system.

2. The apparatus according to claim 1, wherein the transparency regulation element comprises a liquid crystal device.

3. The apparatus according to claim 1, wherein the transparency regulation element is disposed with respect to the first lens system so as to:
   darken a first portion of at least one of the first lenses, through which first portion light passing through the second lens system does not pass, and
   substantially not darken a second portion of the first lenses, through which second portion light passing through the second lens system does pass.

4. The apparatus according to claim 1, wherein the power unit is configured to detect a distance between the frame and a remote object, and to drive the drive the transparency regulation element to darken the first lens system in response to the distance.

5. The apparatus according to claim 1, wherein the transparency regulation element includes a first transparency regulation element, and comprising a second transparency regulation element coupled to the second lens system, wherein the power unit is configured to drive the second transparency regulation element to darken the second lens system during at least a portion of the second period.

6. The apparatus according to claim 1, wherein the second lens system comprises a magnification lens system.

7. The apparatus according to claim 6, wherein the magnification lens system comprises at least one element selected from the group consisting of: a Keplerian telescope, a Galilean telescope, a catadioptric telescope, and a magnifying glass.

8. The apparatus according to claim 6, wherein the one or more first lenses comprise one or more spectacle lens elements, and wherein a portion of at least one of the one or more spectacle lens elements is configured to function as at least a portion of the magnification lens system.

9. The apparatus according to claim 1, wherein at least one of the one or more second lenses is coupled to at least one of the one or more first lenses.

10. The apparatus according to claim 1, wherein the second lens system is coupled to the portion of the frame not via the first lens system.

11. The apparatus according to claim 1, wherein the first lens system is configured for viewing near objects, and wherein the second lens system is configured for viewing far objects.

12. The method according to claim 11, wherein the transparency regulation element includes a first transparency regulation element, and comprising a second transparency regulation element coupled to the second lens system, wherein the power unit is configured to drive the second transparency regulation element to darken the second lens system during at least a portion of the second period.

13. The apparatus according to claim 1, comprising an angle detection device, coupled to the frame, wherein the power unit comprises circuitry configured to process a detection by the angle detection device and drive the transparency regulation element to darken the first lens system in response to the detection.

14. The apparatus according to claim 1, comprising a sensor coupled to the frame, which sensor is configured to generate a sensing signal, wherein the power unit comprises circuitry configured to drive the transparency regulation element to darken the first lens system in response to the signal.

15. The apparatus according to claim 1, wherein the second lens system comprises a prism.

16. The apparatus according to claim 15, wherein the prism is configured for viewing in a generally downward direction.

17. The apparatus according to claim 1, wherein the one or more first lenses comprise one or more first spectacle lenses.

18. The apparatus according to claim 17, wherein the one or more second lenses comprise one or more second spectacle lenses.

19. Apparatus comprising:
a frame;
at least one spectacle lens coupled to the frame;
a prism coupled to the frame;
a transparency regulation element coupled to the lens, the transparency regulation element having variable transparency, and configured to enhance viewing through the prism; and
a power unit, configured to:
during a first period, drive the transparency regulation element to darken the lens without darkening at least a portion of the prism, and
during a second period after the first period, not drive the transparency regulation element to darken the lens.

20. The apparatus according to claim 19, wherein the prism is configured for viewing in a generally downward direction.

21. A method comprising:
placing a vision-enhancing instrument on a face of a subject such that at least a first portion and at least a second portion of the instrument are located in front of a first eye of the subject and not in front of a second eye of the subject;
during a first period while the instrument is placed on the face, electrically darkening the first portion, without substantially darkening the second portion; and
during a second period after the first period, not darkening the first portion.

22. The method according to claim 21, comprising darkening the second portion during at least a portion of the second period.

* * * * *